US011360217B2

(12) United States Patent
Hillard et al.

(10) Patent No.: US 11,360,217 B2
(45) Date of Patent: Jun. 14, 2022

(54) LIDAR SYSTEM AND METHOD OF OPERATION

(71) Applicant: Red Leader Technologies, Inc., Palo Alto, CA (US)

(72) Inventors: Jacob Hillard, Palo Alto, CA (US); Christopher Baca, Palo Alto, CA (US)

(73) Assignee: Red Leader Technologies, Inc., Palo Alto, CA (US)

(*) Notice: Subject to any disclaimer, the term of this patent is extended or adjusted under 35 U.S.C. 154(b) by 0 days.

(21) Appl. No.: 17/500,113

(22) Filed: Oct. 13, 2021

(65) Prior Publication Data

US 2022/0113422 A1 Apr. 14, 2022

Related U.S. Application Data

(60) Provisional application No. 63/091,055, filed on Oct. 13, 2020.

(51) Int. Cl.
*G01S 17/00* (2020.01)
*G01S 17/89* (2020.01)
*G01S 17/34* (2020.01)

(52) U.S. Cl.
CPC .............. *G01S 17/89* (2013.01); *G01S 17/34* (2020.01)

(58) Field of Classification Search
USPC ....................................................... 356/4.01
See application file for complete search history.

(56) References Cited

U.S. PATENT DOCUMENTS

| | | | | |
|---|---|---|---|---|
| 5,532,697 A * | 7/1996 | Hidaka | ................... | G01S 13/60 342/104 |
| 6,031,601 A * | 2/2000 | McCusker | ............. | G01C 15/00 342/145 |
| 7,532,311 B2 * | 5/2009 | Henderson | ........... | G01B 11/026 356/28 |
| 7,642,963 B2 * | 1/2010 | Apostolos | ................. | G01S 5/04 342/375 |
| 8,072,582 B2 * | 12/2011 | Meneely | ................. | G01S 17/10 356/5.01 |
| 8,605,261 B2 * | 12/2013 | Rindle | .................... | G01S 17/18 356/5.03 |
| 9,684,076 B1 | 6/2017 | Feldkhun | | |
| 10,267,898 B2 * | 4/2019 | Campbell | ............... | G01S 17/42 |

(Continued)

FOREIGN PATENT DOCUMENTS

CN 111474553 A 7/2020
DE 102012112985 B3 12/2013
(Continued)

OTHER PUBLICATIONS

Written Opinion of the Int'l Search Authority for PCT/US2019/057946 (5 pages) (Year: 2020).*

(Continued)

*Primary Examiner* — James R Hulka
(74) *Attorney, Agent, or Firm* — Jeffrey Schox; Samuel Rosenthal

(57) ABSTRACT

A LIDAR system, preferably including one or more: optical emitters, optical detectors, beam directors, and/or processing modules. A method of LIDAR system operation, preferably including: determining signals, outputting the signals, receiving one or more return signals, and/or analyzing the return signals.

21 Claims, 12 Drawing Sheets

(56) References Cited

U.S. PATENT DOCUMENTS

| | | | |
|---|---|---|---|
| 10,591,604 B2* | 3/2020 | Xu | G01S 7/4863 |
| 2004/0105087 A1 | 6/2004 | Gogolla et al. | |
| 2006/0227317 A1 | 10/2006 | Henderson et al. | |
| 2009/0195454 A1* | 8/2009 | Apostolos | G01S 5/04 |
| | | | 342/375 |
| 2010/0045965 A1 | 2/2010 | Meneely | |
| 2012/0281200 A1 | 11/2012 | Rindle | |
| 2013/0116977 A1 | 5/2013 | Godbaz et al. | |
| 2018/0224535 A1* | 8/2018 | Sankar | G01S 13/38 |
| 2018/0267169 A1 | 9/2018 | Ku | |
| 2018/0275249 A1 | 9/2018 | Campbell et al. | |
| 2020/0132847 A1 | 4/2020 | Hillard et al. | |
| 2020/0132848 A1* | 4/2020 | Hillard | G01S 7/4804 |
| 2021/0072381 A1* | 3/2021 | Crouch | G01S 17/34 |

FOREIGN PATENT DOCUMENTS

| | | | | |
|---|---|---|---|---|
| WO | WO-2010040924 A1 * | 4/2010 | | G01S 19/30 |
| WO | 2018050906 A2 | 3/2018 | | |
| WO | WO-2020086903 A1 * | 4/2020 | | G01S 7/4804 |
| WO | WO-2020086906 A1 * | 4/2020 | | G01S 7/4815 |

OTHER PUBLICATIONS

Written Opinion of the Int'l Search Authority for PCT/US2019/057954 (6 pages) (Year: 2020).*

Ke, Pinhui, et al., "A Generic Constructions of Z-Periodic Complementary Sequence Sets with Flexible Flock Size and Zero Correlation Zone Length", IEEE Signal Processing Letters, vol. 22, No. 9, Sep. 2015.

Liu, Zilong, et al., "Correlation and Set Size Bounds of Complementary Sequences with Low Correlation Zone", IEEE Transactions on Communications, Dec. 2011.

* cited by examiner

LIDAR SYSTEM AND METHOD OF OPERATION

CROSS-REFERENCE TO RELATED APPLICATIONS

This application claims the benefit of U.S. Provisional Application Ser. No. 63/091,055, filed on 13 Oct. 2020, which is incorporated in its entirety by this reference.

TECHNICAL FIELD

This invention relates generally to the object detection and/or imaging field, and more specifically to a new and useful lidar system and method of operation in the object detection and/or imaging field.

BACKGROUND

Typical lidar systems and methods rely on pulses of light to characterize objects in their surroundings. Their performance is often significantly limited (e.g., in terms of range, resolution, accuracy, etc.) due to a need to wait for each light pulse to return before emitting the next light pulse. Thus, there is a need in the object detection field to create a new and useful lidar system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
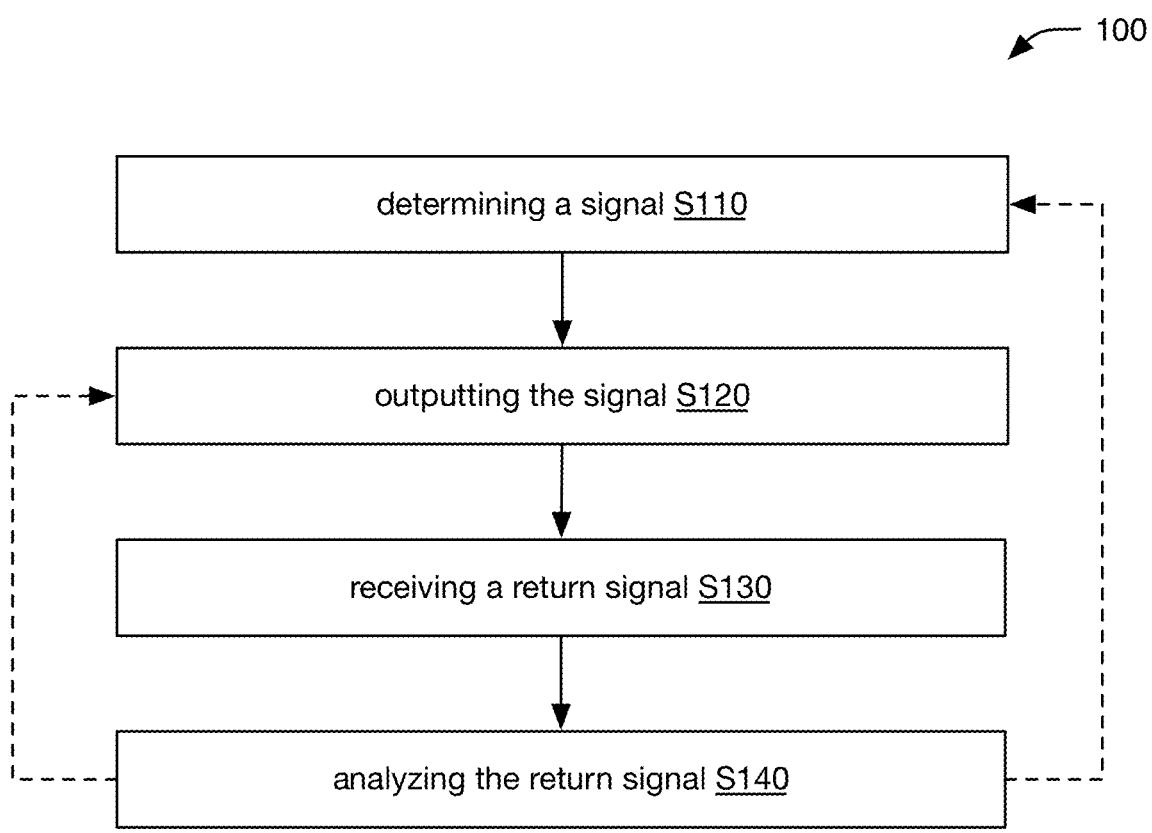
FIGS. 1A-1B are flowchart representations of an embodiment of the method and an example of the embodiment, respectively.
Figure 1B:
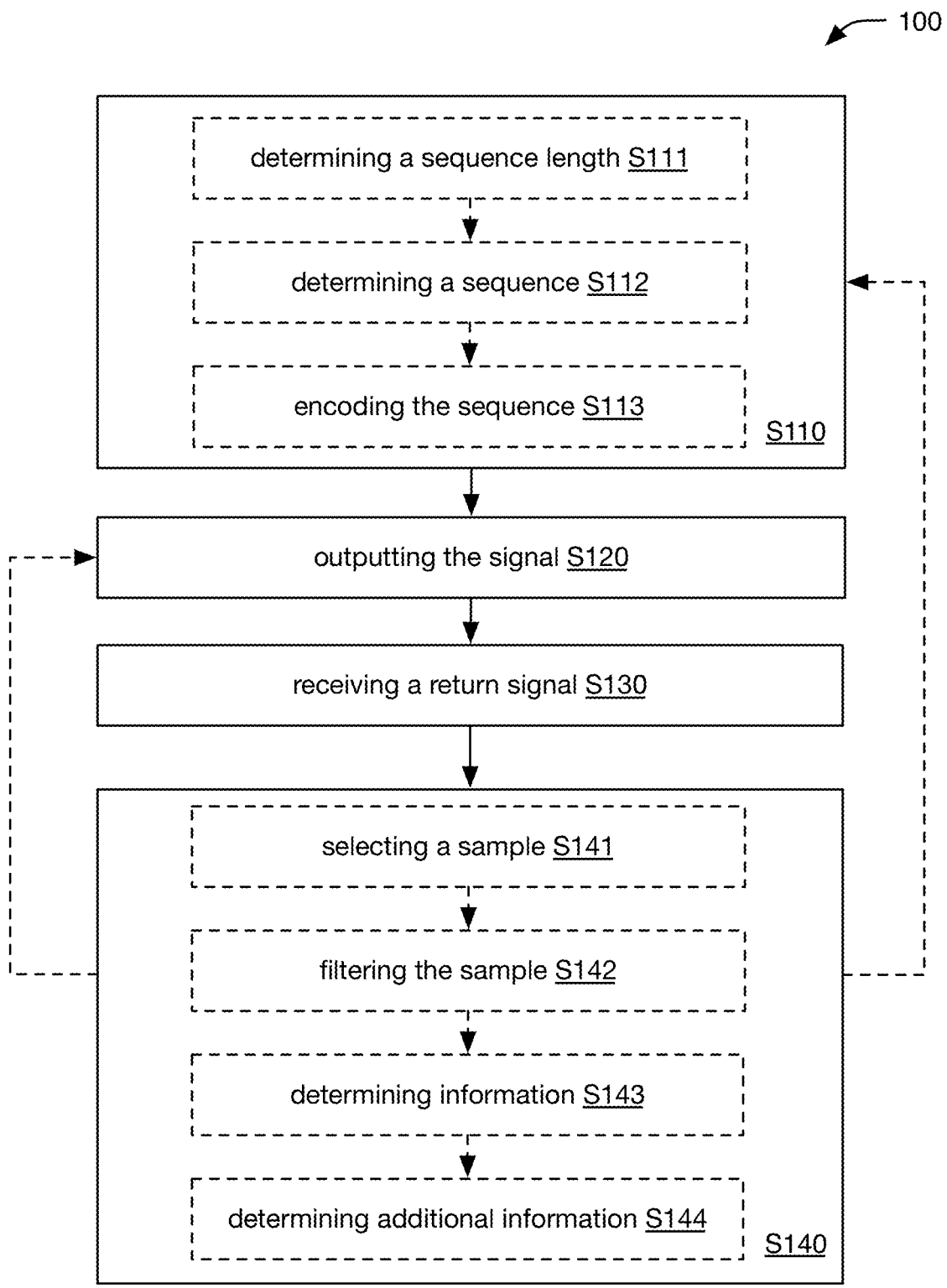

A method 100 of lidar system operation preferably includes: determining a signal S110; outputting the signal S120; receiving a return signal S130; and/or analyzing the return signal S140 (e.g., as shown in FIGS. 1A-1B). However, the method 100 can additionally or alternatively include any other suitable elements performed in any suitable manner. The method 100 is preferably performed using a lidar system 200, but can additionally or alternatively be performed using any other suitable system(s).

Many lidar systems and methods characterize distances to objects in their surroundings based on time delays (e.g., associated with pulses of light emitted by the systems). In contrast, embodiments of the method 100 and/or lidar system 200 described herein use phase delays (e.g., of encoded light signals, such as periodic signals, emitted by the lidar system 200, such as described below in more detail) to characterize distances to (and/or other information associated with) objects in their surroundings. As these phase delays depend on distance (e.g., and are used to characterize a potentially unknown and/or changing arrangement of objects), the encodings used are typically asynchronous. Accordingly, a new type of encoding, consistent with this application, is described herein.

2. System.

Figure 2A:
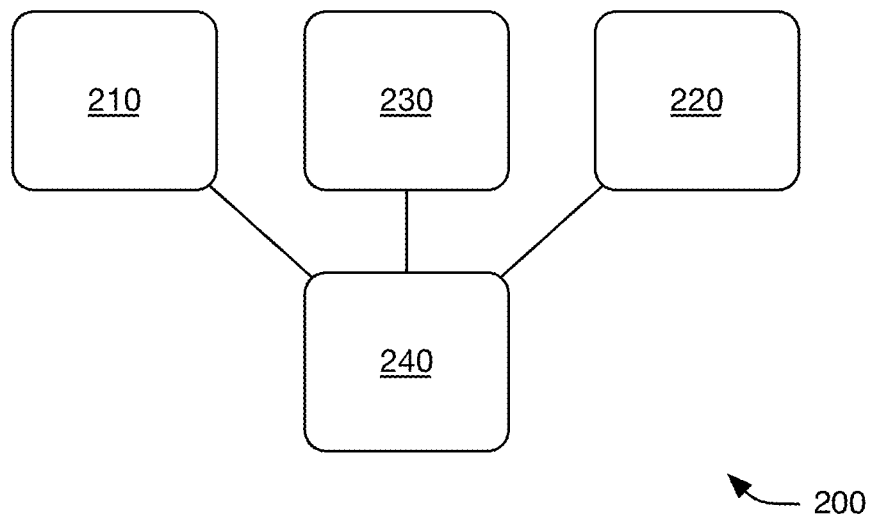
FIG. 2A is a schematic representation of an embodiment of the system.
Figure 2B:
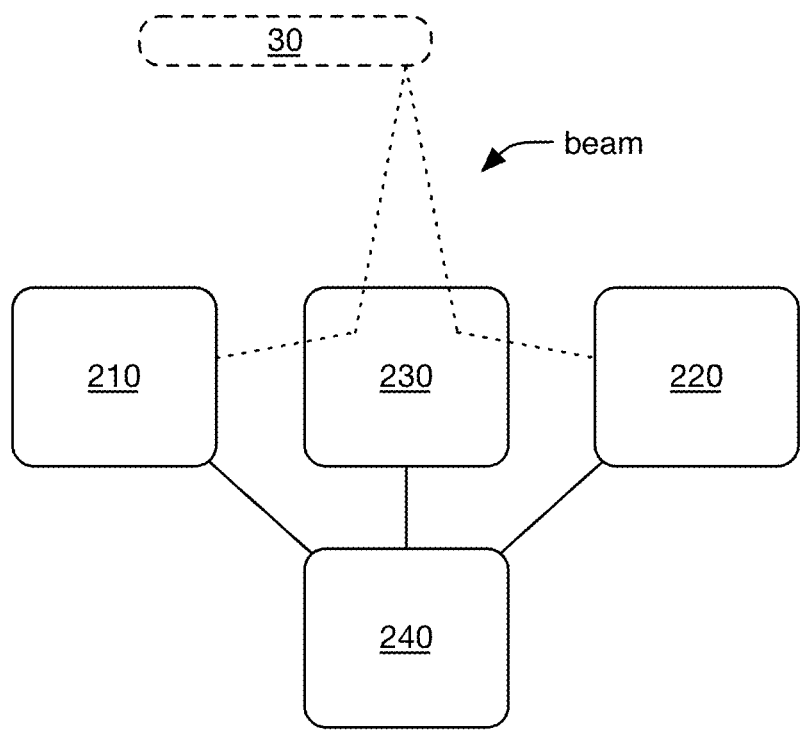
FIG. 2B is a schematic representation of the embodiment of the system in use.

The lidar system 200 preferably includes one or more: optical emitters 210; optical detectors 220; beam directors 230; and/or processing modules 240 (e.g., as shown in FIGS. 2A-2B).

The optical emitter(s) 210 preferably function to (e.g., are operable to) emit one or more optical signals. The optical signals are preferably beam-like (e.g., laser beams), but can additionally or alternatively have any other suitable optical characteristics.

The optical emitters preferably include one or more lasers (e.g., diode lasers). The lasers can include, for example, edge-emitting lasers, surface-emitting lasers (e.g., VCSELs), fiber coupled lasers, and/or lasers of any other suitable types. The lasers are preferably continuous wave lasers (e.g., operable and/or configured to emit substantially continuous wave radiation) but can additionally or alternatively include pulsed lasers (e.g., operable and/or configured to emit pulses of radiation) and/or any other suitable lasers. In one specific example, one or more of the lasers emit light with a wavelength of substantially 900 nm (e.g., 890-910 nm, 875-925 nm, etc.). In a second specific example, one or more of the lasers emit light with a wavelength of substantially 1550 nm (e.g., 1540-1560 nm, 1525-1575 nm, etc.). In a third specific example, one or more of the lasers emit light with a wavelength of substantially 835 nm (e.g., 820-850 nm, 800-870 nm, etc.). The light intensity emitted by the laser is preferably lower than or equal to the limit prescribed by regulatory standards (e.g., the laser can be compliant with IEC-60825, IEC-62471, etc.), but can alternatively be higher. The signal power can be within regulatory limits (e.g., less than a threshold power, such as 5 W 2 W, 1 W, 500 mW, 200 mW, 100 mW, 50 mW, 20 mW, 10 mW, 5 mW, 2 mW, 1 mW, 0.5 mW, 0.2 mW, or 0.1 mW, etc.), preferably less than 1 mW, but can alternatively be higher or lower. However, the lasers can additionally or alternatively include any other suitable lasers.

Each optical emitter 210 preferably includes one or more modulators. Each modulator is preferably operable to modulate one or more aspects (e.g., phase, intensity, wavelength, etc.) of the light emitted by the emitter. However, the system 200 can additionally or alternatively include any other suitable optical emitters.

The optical detector(s) 220 preferably function to (e.g., are operable to) generate an electrical signal (e.g., current, voltage, etc.) in response to optical detection (e.g., representative of the detected optical signal), but can additionally or alternatively generate any other suitable signal (e.g., representative of the detected optical signal) in response to optical signal detection. For example, the optical detectors can include one or more photodiodes (e.g., avalanche photodiodes). The optical detector(s) 220 can optionally include (and/or be supplemented by) one or more demodulators (e.g., digital demodulators, such as computationally-implemented demodulators; analog demodulator circuits; etc.), such as demodulators complementary to the modulators (e.g., configured to convert the encoded signal back into the original sequence). However, the system 200 can additionally or alternatively include any other suitable optical detectors.

The beam director(s) 230 preferably functions to direct the optical signal(s) between aspects of the system 200 and the external environment. For example, a beam director 230 can direct an emitted optical signal (e.g., beam) from an optical emitter 210 to an external location 30 (within the external environment), wherein the optical signal reflects off the external location 30 (and/or other external locations). The optical signal is preferably reflected back to the beam director 230, which directs the reflected signal to an optical detector 220. However, the optical signal can additionally or alternatively be reflected to another beam director 230 (e.g., which directs the signal to the optical detector 220), to the optical detector 220, and/or to any other suitable element(s) of the system 200. Each beam director 230 can direct one or more emitted signal and one or more reflected signals, and can direct the signals between one or more optical emitters 210, external locations 30, and/or optical detectors 220 (e.g., as shown in FIG. 2B). In one example, the beam director 230 includes one or more mirrors, preferably moving and/or moveable mirrors such as rotating mirrors (e.g., continuously rotating) and/or MEMS-based mirrors (e.g., configured to move in response to control inputs), which can direct the optical signal to many external locations 30 over time (e.g., scanning the beam over the locations as the mirror rotates). However, the system 200 can additionally or alternatively include any other suitable beam directors, or include no beam director.

The processing module(s) 240 preferably function to: control other elements of the system 200, such as the optical emitters 210 (e.g., controlling optical emission and/or modulation) and/or beam directors 230 (e.g., controlling the direction of the beam); receive data from other elements of the system 200, such as the optical detectors 220 (e.g., receiving signals associated with light detection); and/or process (e.g., interpret) the received data, such as to determine information about the external environment (e.g., positions of the external locations 30). The processing module 240 is preferably communicatively (e.g. electronically) coupled to the optical emitters 210, optical detectors 220, beam directors 230, and/or any other suitable elements of the system. The processing module 240 preferably includes one or more processors (e.g., CPU, GPU, microprocessor, FPGA, ASIC, etc.) and/or storage units (e.g., Flash, RAM, etc.), but can additionally or alternatively include any other suitable elements. In some variations, the processing module 240 (and/or a supplementary processing module) can be physically separated from the other elements of the lidar system (e.g., wherein the lidar system includes a communication module, such as a wireless communication module, configured to communicate with the processing module). For example, the processing module 240 can be a remote computing system (e.g., Internet-connected server), and the lidar system can communicate with the remote computing system (e.g., wherein some or all computations of the method are performed by the remote computing system). However, the system 200 can additionally or alternatively include any other suitable processing modules.

In some embodiments, the lidar system 200 includes one or more elements such as described in U.S. patent application Ser. No. 16/663,142, filed 24 Oct. 2019 and titled "Lidar System and Method of Operation", and/or in U.S. patent application Ser. No. 16/663,249, filed 24 Oct. 2019 and titled "Lidar System and Method of Operation", each of which is herein incorporated in its entirety by this reference; for example, the lidar system 200 can include the entire 'lidar system 200' of U.S. patent application Ser. No. 16/663,142, the entire 'lidar system 10' of U.S. patent application Ser. No. 16/663,249, a subset of one or both, and/or any other suitable combination of elements and/or functionalities of the two. However, the system 200 can additionally or alternatively include any other suitable elements in any suitable arrangement.

3. Encodings.

Signals can be encoded in many different ways. In some embodiments, signal encodings can include low cross-correlation codes (LCCs). Typical LCCs (e.g., Gold codes, Kasami codes, Hadamard codes, Zadoff-Chu sequences, etc.), such as zero cross-correlation codes (ZCCs), may be used in many applications. These codes can exhibit low (e.g., zero) cross-correlation, but only for synchronized applications (e.g., synchronous CDMA). Phase alignment between the different signals (signals encoded using such encodings) is required in order to achieve low cross-correlation. In contrast, in asynchronous applications (e.g., in which phase offsets between different signals are unknown, uncontrolled, and/or varying), use of such ZCCs and/or other LCCs will typically result in cross-correlations no better than (e.g., similar to or worse than) those achieved using pseudo-random noise (e.g., spreading sequences). For example, the cross-correlation between two ZCCs may be zero for substantially perfect phase alignment (e.g., zero phase offset) but higher (e.g., similar to levels seen with pseudo-random noise) for any non-zero phase offset.

Figure 4A:
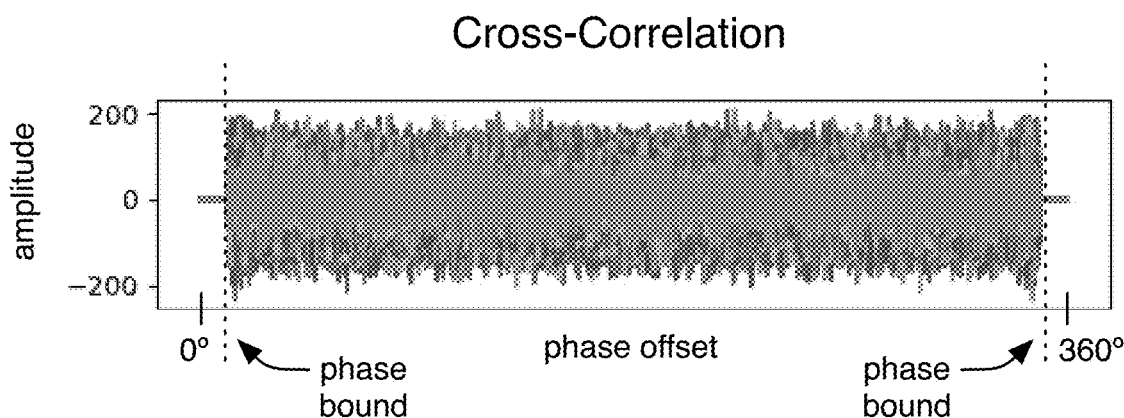
FIGS. 4A-4B are representations of cross-correlation and auto-correlation, respectively, of a first example of a set of phase-bounded low cross-correlation codes.
Figure 4B:
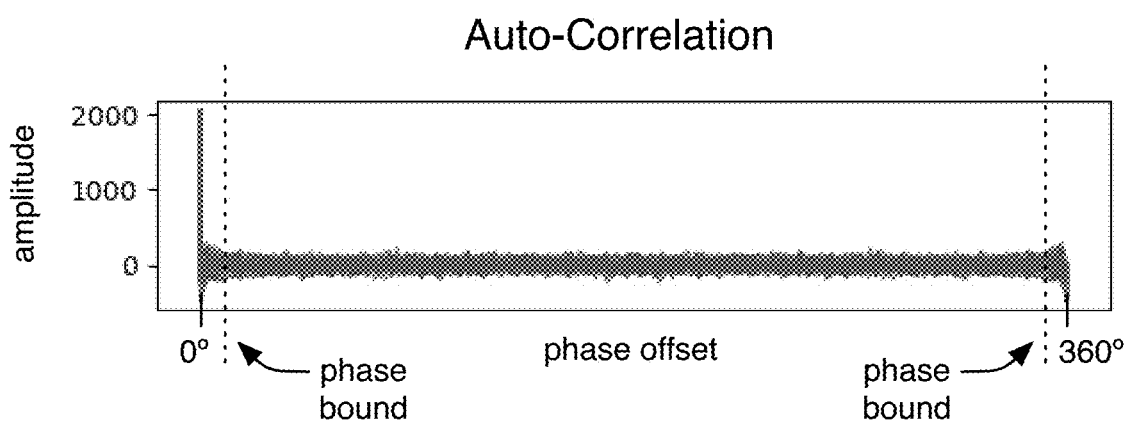

We describe herein a new phase-bounded approach to low cross-correlation encodings. These phase-bounded low cross-correlation codes (PB-LCCs) can define a phase bound, wherein a set of PB-LCCs exhibit low cross-correlation across a range of phase alignments within the phase bound (e.g., within a threshold phase shift of zero, such as +/−5, 10, 15, 20, 25, 35, 45, 60, 0-10, 10-30, and/or 30-90°, etc., wherein a 360° phase shift correlates with a delay equal to the full period of the encoding) but exhibit higher cross-correlation (e.g., similar to that exhibited by pseudo-random noise) outside this phase bound (e.g., as shown in FIG. 4A). Additionally, these PB-LCCs preferably also exhibit low auto-correlation sidelobes (e.g., low auto-correlation for non-zero phase offsets, such as all non-zero phase offsets, non-zero phase offsets within the phase bound, non-zero phase offsets within a second phase bound different from the cross-correlation phase bound, etc.), such as shown by way of example in FIG. 4B.

In some embodiments, one or more sets of PB-LCCs can be determined via numerical optimization. For example, optimization can be performed using an objective function based on cross-correlation and/or auto-correlation. The objective function can be based on cross-correlation between encodings within the phase bound. For example, the objective function can be based on (e.g., equal or proportional to) the highest cross-correlation between any two encodings of the set anywhere within the phase bound (this maximum in-bound cross-correlation can be denoted as $C_{max}$). The objective function can additionally or alternatively be based on auto-correlation, within the phase bound and/or for any phase offset (e.g., based on the highest auto-correlation anywhere other than a zero phase shift; this maximum in-bound auto-correlation can be denoted as $A_{max}$). Performing the numerical optimization can include iteratively modifying one or more encodings of a set in order to reduce $C_{max}$ and/or $A_{max}$; for example, to reduce an objective function based on $C_{max}$ and/or $A_{max}$ (e.g., objective function $f = a\, A_{max} + c\, C_{max}$ for any suitable constants a and c, preferably non-negative constants).

A set of PB-LCCs can define by one or more characteristic ratios. In some examples, the set can define by an in-bound rejection ratio $R_{rej} = C_{max}/A_0$, wherein $A_0$ is the minimum zero-phase-offset autocorrelation. Note that $C_{max}$, rather than a root mean square (or other smoothed representation) of the cross-correlation, is preferably used for the rejection ratio, as increased values of $C_{max}$ represent increased probability of a single false detection event (which, in some embodiments, is preferably avoided). In some examples (e.g., using 16 signals, each with an encoding length of 2048), an analogous overall rejection ratio (e.g., for PB-LCCs, for pseudo-random noise, etc.) may have a value typically around 17-20 dB, wherein the overall rejection ratio is defined based on the maximum overall cross-correlation, rather than the maximum in-bound cross-correlation. In contrast, within the phase bound, the rejection ratio can be greater (preferably much greater) than it is outside the phase bound. For example, the in-bound rejection ratio can be greater than the dynamic range of the signal-processing hardware (e.g., greater than 30, 40, 50, 60, 70, 25-40, 40-60, and/or 60-80 dB, etc.).

The set of encodings can additionally or alternatively define a cross-bound ratio $R_{CB}$. The cross-bound ratio is preferably defined as the ratio of the maximum in-band versus out-of-band cross-correlation. In some examples (e.g., for 16 signals, each with an encoding length of 2048 and a phase bound of ±3.125%) in which all encodings are normalized to unity power (e.g., variance), $C_{max}$ may have a value of approximately 0.3, whereas the maximum out-of-bound cross-correlation may have a value of approximately 200, corresponding to a cross-bound ratio greater than 600. For examples with a smaller phase bound, a lower value of $C_{max}$ may be achievable (e.g., without significant change to the maximum out-of-bound cross-correlation), resulting in a higher cross-bound ratio; whereas a larger phase bound may result in a higher value of $C_{max}$ and thus a lower cross-bound ratio. In other examples, $R_{CB}$ can be approximately 10, 30, 100, 300, 1000, 3000, 10-100, 100-1000, 1000-10,000, and/or any other suitable value.

Figure 4C:
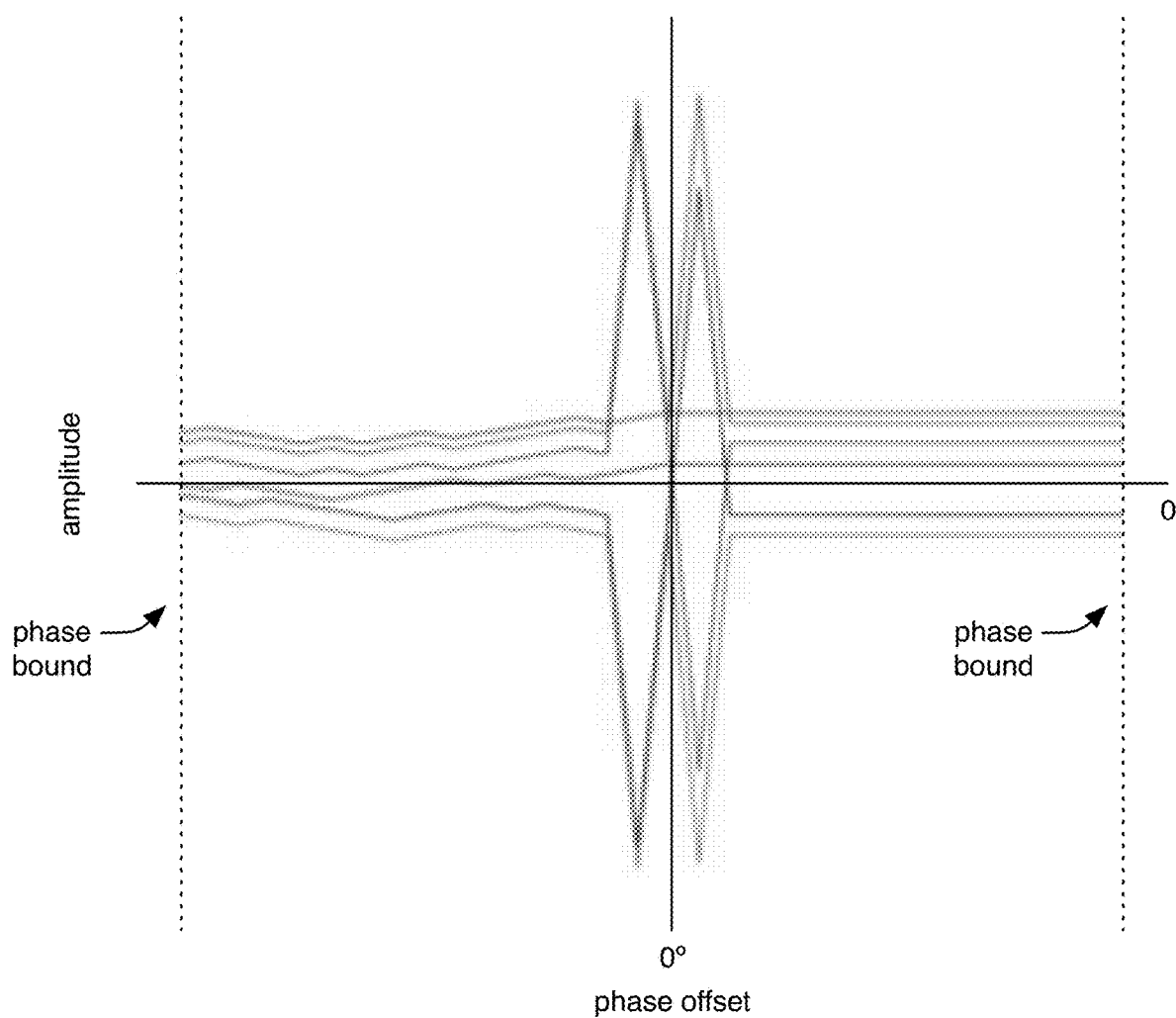
FIG. 4C is a representation of cross-correlation of a second example of a set of phase-bounded low cross-correlation codes.

In some variations, the PB-LCCs can exhibit low cross-correlation within most of the phase bound, with the exception of one or more phase alignments (or phase alignment ranges) associated with higher cross-correlation. For example, in some such variations, some pairs of PB-LCCs may exhibit low cross-correlation throughout the entire phase bound, whereas others may exhibit low cross-correlation throughout the phase bound except for a single phase alignment (or small range of phase alignments) at which the cross-correlation is increased (e.g., as shown in FIG. 4C). In a specific example, a set of PB-LCCs can include a plurality of pairs, wherein each such pair of PB-LCCs exhibits low cross-correlation throughout the entire phase bound, and any other combination of two PB-LCCs from the set (other than these pairs) exhibits low cross-correlation throughout the phase bound except for a single phase alignment at which the cross-correlation is increased. In such variations, the method can optionally include performing corrections to compensate for these higher cross-correlation portions (and/or for any other suitable interference arising from cross-correlation between the codes), such as described below in more detail regarding S1422.

For variations in which the cross-correlation within the phase bound exhibits one or more small regions (e.g., associated only with a single phase alignment bin, wherein the bin size is based on the sequence length of the encodings) of higher cross-correlation values, the objective function can be based on the highest cross-correlation between any two encodings of the set anywhere within the phase bound except for these one or more small regions of higher cross-correlation. This maximum-but-for-small-regions in-bound cross-correlation can be denoted as $C\text{\textasciitilde}_{max}$. A person of skill in the art will recognize that, where aspects of $C_{max}$ are described herein, $C\text{\textasciitilde}_{max}$ may exhibit similar properties in such variations having small regions of higher cross-correlation. Further, in such variations, for any values based on $C_{max}$ described herein, an analogous value, in which $C\text{\textasciitilde}_{max}$ is substituted for $C_{max}$, may be analogously determined and/or applied.

In some variations, each PB-LCC includes multiple sub-sequences (wherein each PB-LCC of a set includes the same number of sub-sequences), wherein cross-correlation between the overall PB-LCCs may not be low (e.g., even within the phase bound), but it may be possible to combine (e.g., mathematically, such as via linear operations) the cross-correlations of the sub-sequences to generate a low cross-correlation signal. In one example, each PB-LCC includes N sub-sequences, wherein each sub-sequence of a first PB-LCC corresponds to an associated sub-sequence of one or more other PB-LCCs of the set (e.g., wherein the corresponding sub-sequences are intended to be output concurrently), and the cross-correlation of the corresponding sub-sequences can be summed (or otherwise combined) to generate a low (or zero) cross-correlation signal. Each sub-sequence preferably has the same duration, but the sub-sequences can alternatively have any suitable durations. In a specific example, each PB-LCC of the set includes two sub-sequences (e.g., code 1 includes sub-sequences $1_A$ and $1_B$, code 2 includes sub-sequences $2_A$ and $2_B$, etc.). In this specific example, the cross-correlation of any two codes of the set may not be low within any phase bound; however, a cross-correlation for the first sub-sequences (e.g., cross-correlation of sub-sequences $1_A$ and $2_A$) can be combined (e.g., summed) with a cross-correlation for the second sub-sequences (e.g., cross-correlation of sub-sequences $1_B$ and $2_B$), where this combination (e.g., sum) will be low (e.g., substantially zero) within a phase bound (e.g., throughout the entire phase bound, throughout the entire phase bound except for one or more limited ranges of larger values, etc.). Accordingly, this property could be used to recover responses associated with such PB-LCCs from signals received such as described below regarding the method.

However, the set(s) of PB-LCCs can additionally or alternatively have any other suitable characteristics and/or can be determined in any other suitable manner. Further, the signals can additionally or alternatively be encoded using any other suitable set(s) of encodings.

4. Method.

4.1 Determining a Signal.

Figure 3A:
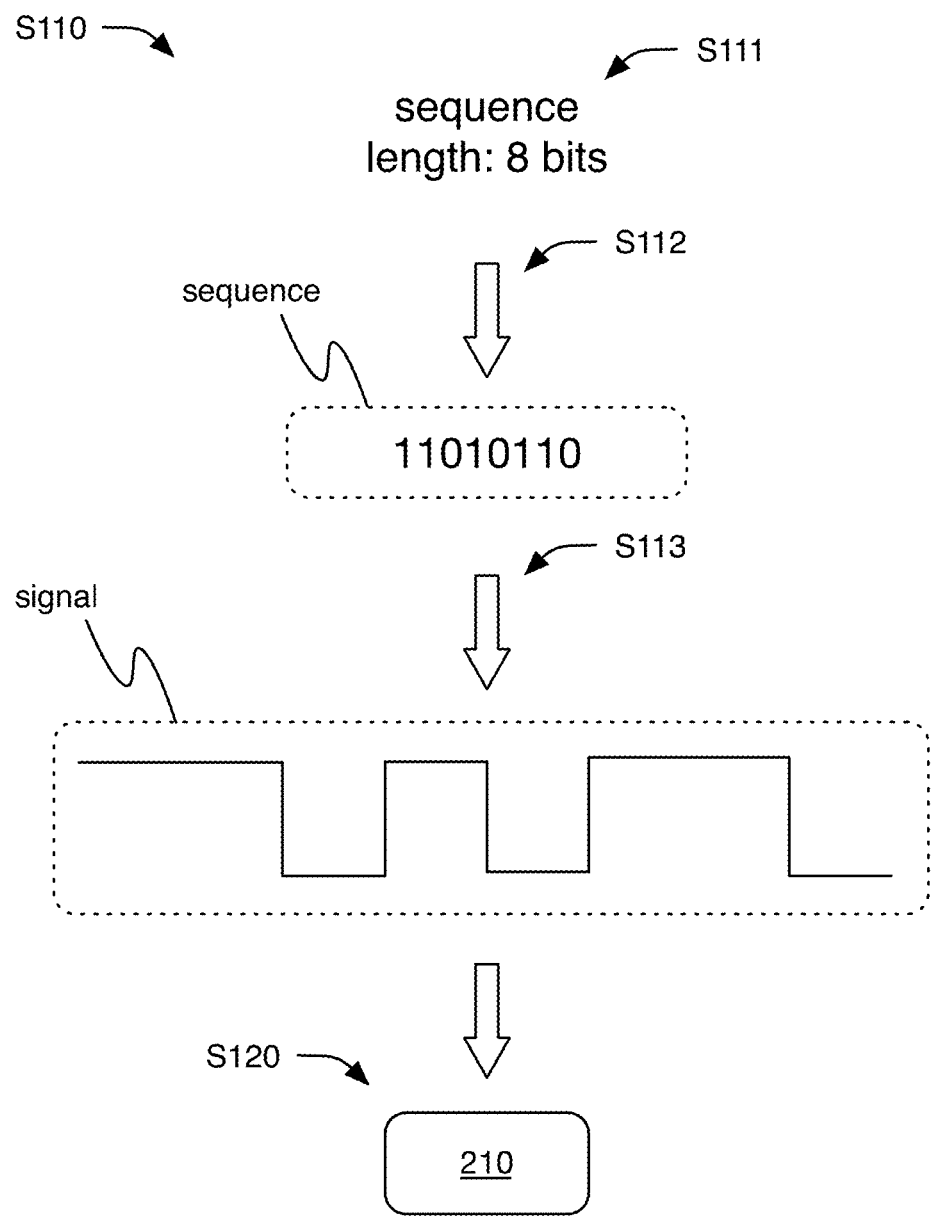
FIGS. 3A-3B are schematic representations of examples of determining signals.

Determining a signal S110 preferably functions to determine the signal that the lidar system outputs, which can function to control various aspects of object detection performance. Determining the signal S110 preferably includes determining a sequence S112 and/or encoding the sequence S113, and can optionally include determining a sequence length Sill (e.g., as shown in FIG. 3A). However, S110 can additionally or alternatively include any other suitable elements.

4.1.1 Determining a Sequence Length.

Figure 3B:
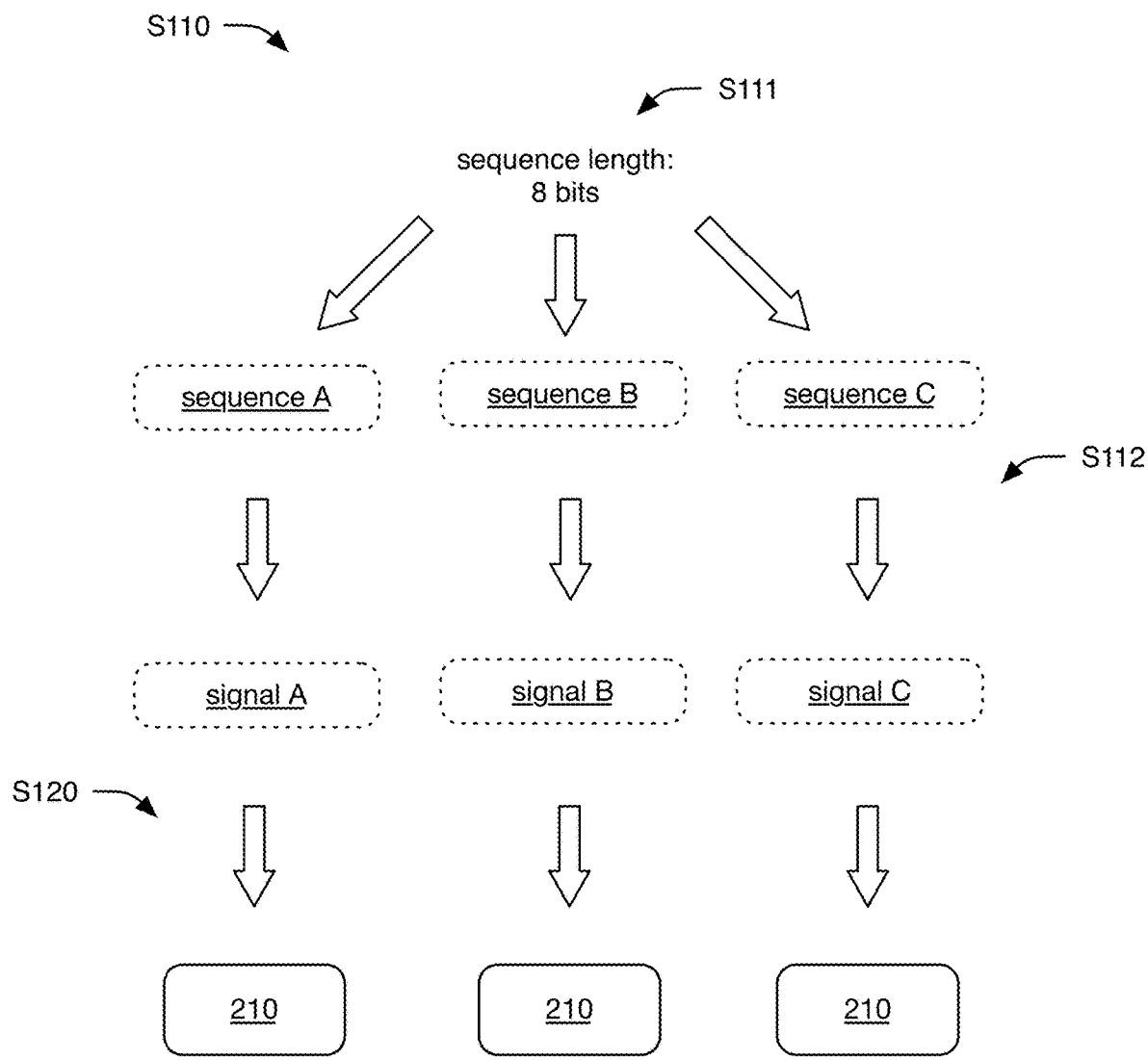

Determining a sequence length S111 can function to control tradeoffs between various system performance metrics (e.g., as described below in further detail). The sequence length is preferably a metric associated with sequence size, such as corresponding to a number of substantially equal-duration time intervals in which the sequence can take on different values (e.g., different output intensities). In examples, the sequence length can be a number of continuously (or pseudo-continuously) valued output intensities (e.g., represented as digital numerical representations such as integer or floating point representations, represented as analog intensities, etc.) in the sequence, a bit-length (e.g., wherein the sequence is a binary sequence), a number of symbols (e.g., non-binary digits) in the sequence, an effective sequence length equal to a signal duration multiplied by a system bandwidth or a value proportional thereto (e.g., wherein, for a continuously-varying signal, the effective sequence length is representative of the approximate number of samples that the system can resolve in the signal), and/or any other suitable metric associated with sequence size. The same sequence length is preferably used for multiple sequences, such as concurrently-emitted sequences (e.g., wherein a plurality of sequences are output substantially concurrently, such as each output by a different optical emitter of the system; example shown in FIG. 3B) and/or serial sequences (e.g., a time series of multiple sequences, emitted by a single optical emitter of the system). Alternatively, different sequence lengths can be used for a single continuous signal and/or multiple, concurrently-emitted signals.

The sequence length is preferably determined as described in U.S. patent application Ser. No. 16/663,142, filed 24 Oct. 2019 and titled "Lidar System and Method of Operation", which is herein incorporated in its entirety by this reference (e.g., as described regarding 'determining a sequence length S111'), but can additionally or alternatively be determined in any other suitable manner.

In some embodiments, the sequence length is selected to be in the range 10-10,000 bits (e.g., between 100 and 5000 bits). However, S111 can additionally or alternatively include selecting any other suitable sequence length.

The sequence length is preferably determined based on one or more desired performance metrics (e.g., to achieve at least a minimum performance level for a first set of metrics, to maximize performance according to a second set of metrics, etc.).

In examples, the sequence length can be automatically determined (e.g., selected, calculated, etc.) based on operating context, such as geographic location, system kinematics (e.g., velocity, acceleration), presence of objects detected within a given physical range, performance metric values, and/or other contextual variables; automatically determined based on a set of target performance metric values (e.g., received from a user, determined based on operating context); manually determined; and/or otherwise determined. For example, the method can include: receiving target values for one or more performance metrics, and selecting the sequence length associated with the received performance metric target values (e.g., from a sequence length-performance metric value table or other data structure). The association between the performance metric value and the sequence length can be: predetermined (e.g., calculated, tested), iteratively determined, and/or otherwise determined.

In another example, the method can include: adjusting the sequence length until the performance metrics satisfy a set of performance metric target values. However, the sequence length can additionally or alternatively be determined in any other suitable manner.

The performance metrics can include accuracy, range, resolution, latency, power consumption, and/or any other suitable metrics (e.g., used such as described in U.S. patent application Ser. No. 16/663,142, filed 24 Oct. 2019 and titled "Lidar System and Method of Operation", which is herein incorporated in its entirety by this reference).

Range is preferably the maximum distance at which an object can be reliably detected while implementing the method 200 (e.g., without the possibility of an aliasing and/or range ambiguity issue, such as arising from periodicity of the output signal; while maintaining the failure probability below a threshold value, such as less than a 0.1%, 0.2%, 0.5%, 1%, 2%, 5%, or 10% complete miss probability, preferably less than a 1% complete miss probability; while receiving sufficiently strong return signals to reliably perform the method; etc.). Because the signal period typically increases with sequence length (e.g., for a fixed symbol rate, it increases linearly), range typically increases with longer sequences (e.g., wherein, to avoid potential periodic range ambiguity, the range is less than or equal to half the distance that the signal propagates during one period of the signal, corresponding to the round-trip propagation time of the signal reflecting off a maximum-range object). However, the range may more typically be limited by signal strength, such as by the strength of the return signals received by the system (e.g., wherein return signals reflected from more distant objects in the environment may be weaker than those reflected from closer objects). An increased sequence length can increase the discrimination power of the matched filter and/or can increase the detection integration time, which can enable more reliable detection of more distant objects (and/or other weakly-returning objects) in the environment. In some examples, the sequence length (and/or other signal parameters, such as symbol rate) is selected so that the range (e.g., ambiguity-limited range, return signal strength-limited range, etc.) is more than, no less than, and/or substantially equal to a threshold distance, such as 50, 100, 150, 200, 250, 275, 300, 325, 350, 400, 450, 500, 600, 10-50, 50-150, 150-450, or 450-1000 m. In a first specific example, the threshold distance is 300 m. In a second specific example, the threshold distance is 200 m, limited by return signal strength, which can correspond to a sequence length that would enable an ambiguity-limited range of 1-5 km (e.g., approximately 2 km). In a variation of the second specific example, the threshold distance is 500 m, limited by return signal strength, which can correspond to a sequence length that would enable an ambiguity-limited range of 3-10 km (e.g., approximately 5 km).

Accuracy can include detection failure probability (e.g., "complete miss" probability), detected distance accuracy (e.g., "Cramer-Rao lower bound" or "CRLB"), and/or any other suitable accuracy metrics. Latency is preferably the amount of time per sweep (e.g., time between consecutive signal outputs at a particular beam orientation, such as corresponding to beam outputs at all the probed external locations). Resolution is preferably the angular spacing between adjacent beam directions (e.g., the angle defined between the vectors from the optical emitter to each of two adjacent external locations).

However, S110 can alternatively include using a predetermined sequence length (e.g., rather than determining a sequence length dynamically), and/or the sequence length can be determined in any other suitable manner.

4.1.2 Determining a Sequence.

Determining a sequence S112 preferably functions to determine one or more unique sequences (e.g., all having a particular sequence length, such as a sequence length determined in S111). Each sequence can be a digital sequence (e.g., binary sequence, non-binary digital sequence, etc.), an analog (e.g., continuously-valued and/or pseudo-continuously-valued) sequence, such as a sequence of integers and/or of real numbers (e.g., in digital, analog, and/or any other suitable representation), and/or any other suitable sequence. In some embodiments, the sequences can be determined such as described in U.S. patent application Ser. No. 16/663,142, filed 24 Oct. 2019 and titled "Lidar System and Method of Operation", which is herein incorporated in its entirety by this reference, but can additionally or alternatively be determined in any other suitable manner.

The sequences are preferably determined to achieve a high degree of orthogonality (e.g., orthogonality between different sequences, orthogonality between encoded signals corresponding to the different sequences, orthogonality to environmental noise, etc.). Accordingly, the sequences are preferably determined to meet one or more of the following criteria (e.g., as described in more detail in U.S. patent application Ser. No. 16/663,142, filed 24 Oct. 2019 and titled "Lidar System and Method of Operation", which is herein incorporated in its entirety by this reference): high auto-correlation at zero time delay (zero phase offset); low auto-correlation away from zero time delay (non-zero phase offset); and/or low cross-correlation with other signals present in the system's environment (e.g., other sequences of a set). The low cross-correlation can be exhibited for some or ah phase offsets (e.g., for a set of PB-LCCs, exhibited for phase offsets within a phase bound defined by the set of PB-LCCs; alternatively, exhibited for all phase offsets within the phase bound except for one or more small phase alignment ranges for which the PB-LCCs are known to exhibit higher cross-correlation, such as described above in more detail regarding 'Encodings').

S112 can optionally include determining a detection range limit (and a corresponding phase bound) and/or otherwise determining a phase bound. The detection range limit is preferably consistent with (e.g., no more limiting than) other system limitations (but alternatively can be more limiting). For example, the detection range limit can be consistent with hardware and/or regulatory considerations (e.g., light intensity, photodetector sensitivity, hardware noise floor, etc.) which limit detection range to a threshold distance $D_1$ (e.g., 500 m). In this example, the encoding sequence length can correspond to a greater distance $D_2$ (e.g., 5 km), preferably wherein $D_2=tc/2$, where t is the encoding sequence period and c is the speed of light. Thus, in this example, the phase bound can be set greater than or equal to $D_1/D_2$; for $D_1=500$ m and $D_2=5$ km, $D_1/D_2=10\%$ of the period, corresponding to a phase bound equal to or wider than $+/-36°$. The phase bound can be predetermined (e.g., based on system calibration and/or performance metrics, based on historical data, based on any other suitable information, etc.), dynamically determined (e.g., based on current and/or recent system performance and/or other data), and/or determined in any other suitable manner.

Preferably, S112 includes determining multiple sequences (e.g., each associated with a different emitter, such as different emitters of the system, of different systems, etc.), preferably each having the same sequence length (e.g., a single sequence length determined in Sill). In some embodiments, S112 includes determining a set of PB-LCCs (e.g., as described above in more detail, such as regarding 'Encodings'). In such embodiments, S112 preferably includes determining the set of PB-LCCs based on the phase bound (e.g., phase bound determined such as described above), more preferably wherein the set exhibits a phase bound equal to (or wider than) the phase bound determined as described above.

Determining the sequences can include selecting from a plurality of predetermined encodings (e.g., selecting based on one or more parameters, such as sequence length and/or phase bound), dynamically generating (e.g., computing) the encodings (e.g., based on, such as in response to determining and/or receiving, one or more parameters, such as sequence length and/or phase bound), and/or determining the encodings in any other suitable manner. For example, the system can maintain a database of orthogonal sequence sets (e.g., sets of PB-LCC) for each of a plurality of sequence lengths and/or phase bounds. The database can optionally include a matched filter set for each orthogonal sequence set (e.g., Fourier transforms and/or discrete Fourier transforms of each of the sequences and/or corresponding encoded signals).

However, the sequences can additionally or alternatively be determined in any other suitable manner.

In examples, the sequences can include one or more of: continuously (or pseudo-continuously) valued output intensities (e.g., represented as digital numerical representations such as integer or floating point representations, represented as analog intensities, etc.), binary outputs (e.g., high and low, such as on and off, values), symbols (e.g., corresponding to non-binary digits), continuously-varying outputs, and/or any other suitable sequence elements.

4.1.3 Encoding the Sequence.

Encoding the sequence S113 preferably functions to generate an encoded signal based on the sequence (e.g., for each sequence determined in S112, generating a corresponding encoded signal). The generated signal is preferably periodic, repeating the encoded sequence, more preferably wherein there is no (or substantially no) temporal gap between sequence repeats (e.g., wherein the encoded sequence restarts as soon as the previous iteration ends) but alternatively including substantial temporal gaps between some or all sequence repeats. However, the generated signal can alternatively be aperiodic and/or have any other suitable characteristics. Generating the encoded signal preferably includes modulating a carrier signal (more preferably, a continuous-wave or substantially continuous-wave carrier signal), such as an optical carrier (e.g., laser output) of substantially constant amplitude or substantially periodically-varying amplitude (e.g., sinusoid, square wave, etc.). S113 is preferably performed such as described in U.S. patent application Ser. No. 16/663,142, filed 24 Oct. 2019 and titled "Lidar System and Method of Operation", which is herein incorporated in its entirety by this reference, but can additionally or alternatively be performed in any other suitable manner.

The sequence can be encoded for use in an amplitude-modulated continuous wave (AMCW) lidar system, a frequency-modulated continuous wave (FMCW) lidar system, and/or any other suitable lidar system. Accordingly, encoding the sequence preferably includes performing amplitude modulation and/or optical frequency modulation on the carrier signal (e.g., continuous-wave carrier signal). For example, a binary sequence can be encoded for use in an AMCW system, or an analog (or pseudo-analog) sequence can be encoded for use in an FMCW system. The sequence can be encoded using a modulation method (or multiple methods), preferably a digital modulation method (e.g., onto a carrier signal such as a sinusoid). The modulation method is preferably a phase-shift keying (e.g., BPSK, QPSK, 8-PSK, higher order PSK, etc.), but can additionally or alternatively include quadrature amplitude modulation (QAM), pulse amplitude modulation (PAM), frequency-shift keying (FSK), amplitude-shift keying (ASK), and/or any other suitable modulation method. Alternatively, no carrier signal and/or modulation method can be used. In a first such example, S113 includes directly mapping bits and/or symbols to output intensities. In a first specific example of this example, S113 includes mapping 0 bits to a low or substantially zero intensity and mapping 1 bits to a high intensity, or vice versa. In a second specific example of this example, S113 includes mapping sequence values (e.g., integer values, real number values such as floating-point values, etc.) to corresponding output intensities (e.g., wherein the sequence values and output intensities, such as output powers, define a substantially linear relationship). In a second such example, S113 includes directly mapping bits and/or symbols to changes in output intensity, such as mapping 0 bits to an unchanged intensity and mapping 1 bits to a change in intensity (e.g., flip from one level to the other), or vice versa.

However, the sequence can additionally or alternatively be encoded in any other suitable manner.

4-2 Outputting the Signal.

Outputting the signal S120 preferably functions to emit an output (e.g., a beam, preferably a beam of light) that includes the signal to be output (e.g., the signal determined in S110). S120 can include controlling a transducer, preferably an optical emitter such as described above (e.g., a laser), to output the signal. For example, a modulator (e.g., as described above, such as regarding the system 200) can be employed to include the signal in the output, such as by modulating the amplitude, optical frequency, and/or any other suitable characteristic(s) of an optical carrier (e.g., continuous-wave laser beam) based on the signal. S120 preferably includes continuously outputting the signal (e.g., for a periodic signal), but can alternatively include outputting the signal a single time and/or any other suitable number of times with any suitable timing. In embodiments including multiple transducers (e.g., multiple optical emitters, such as multiple lasers), S120 preferably includes emitting multiple outputs, more preferably concurrently or substantially concurrently (e.g., emitting all the outputs continuously or substantially continuously, emitting pulsed and/or sporadic outputs at substantially the same time as each other, etc.). However, the multiple outputs can additionally or alternatively be emitted with any other suitable timing.

During S120, the beam director is preferably controlled to direct the output signal toward one or more external locations 30 (e.g., as described above, such as regarding the system 200). Upon reaching the external location(s), the beam can be reflected (e.g., back toward the system). In one example, the beam director can be controlled to direct the beam substantially in a first direction over a first dwell time interval (e.g., substantially equal to one period of the signal), then in a second direction over a second dwell time interval, preferably substantially equal in duration to the first dwell time interval, and so on, eventually substantially returning to the first direction and repeating continuously (e.g., until the output parameters, such as sequence length, resolution, symbol rate, etc., are altered).

S120 is preferably performed such as described in U.S. patent application Ser. No. 16/663,142, filed 24 Oct. 2019 and titled "Lidar System and Method of Operation", which is herein incorporated in its entirety by this reference, but can additionally or alternatively be performed in any other suitable manner.

4.3 Receiving a Return Signal.

Receiving a return signal S130 preferably functions to detect one or more reflections of the output signal (e.g., from one or more objects within an environment surrounding the system, such as objects at the external location(s)). The signal can be received at a transducer (e.g., of the system, such as close to and/or otherwise collocated with the optical emitter or other output transducer of the system), preferably an optical detector (e.g., photodiode, such as an avalanche photodiode (APD), etc.), such as described above regarding the system 200. In some embodiments (e.g., wherein multiple signals are output substantially concurrently), multiple signals (e.g., reflections of different output signals, different reflections of a single output signal, etc.) can be received at the transducer during S130 (e.g., received substantially concurrently and/or otherwise temporally overlapping). The return signal is preferably a reflection (e.g., direct reflection, specular reflection, etc.) of the output signal. However, S130 can additionally or alternatively include receiving any return signal associated with (e.g., induced by) the output signal, and/or receiving any other suitable signals.

The received signal(s) are preferably sampled (e.g., by a circuit, such as an analog-to-digital converter circuit, that samples an electrical output of the transducer, such as the current and/or voltage generated by the transducer in response to reception of the received signals) at a sufficient rate to resolve the signal(s), such as sampling at a rate at least twice the bandwidth of the anticipated signal(s). In one example, the received signals are sampled at a rate of at least 2.5 times the symbol rate of the output signals (e.g., for a 100 MHz symbol rate, corresponding to a 125 MHz output signal bandwidth, sampling at a rate of at least 250 MHz).

S130 is preferably performed such as described in U.S. patent application Ser. No. 16/663,142, filed 24 Oct. 2019 and titled "Lidar System and Method of Operation", which is herein incorporated in its entirety by this reference, but can additionally or alternatively be performed in any other suitable manner.

4.4 Analyzing the Return Signal.

Figure 5A:
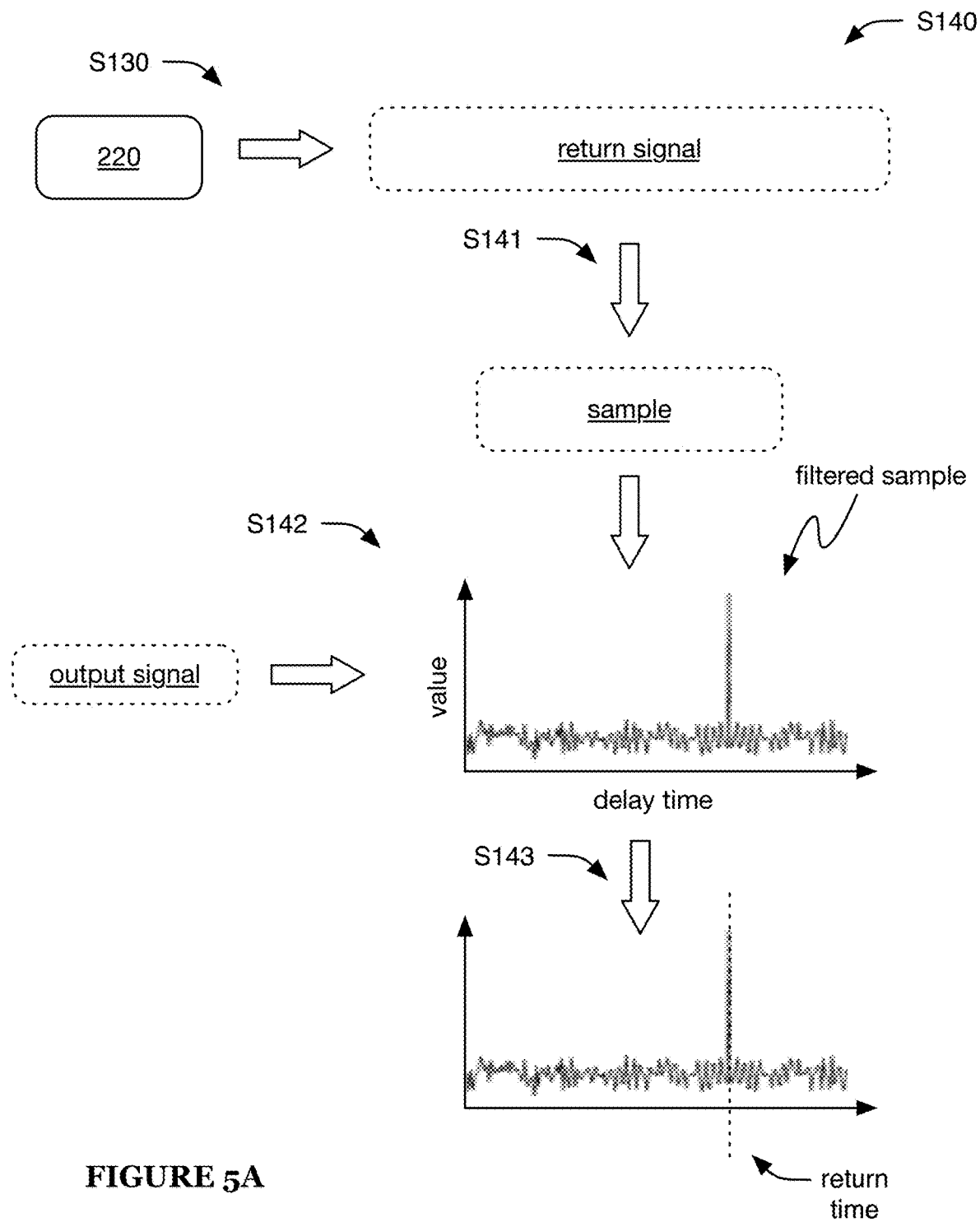
FIGS. 5A-5B are schematic representations of examples of analyzing return signals.

Analyzing the return signal S140 preferably functions to determine the position of one or more external locations (e.g., off of which the signal was reflected) relative to the system. Analyzing the return signal S140 preferably includes selecting a sample from the return signal S141, filtering the sample S142, and/or determining information based on the signal S143 (e.g., as shown in FIG. 5A). However, analyzing the return signal S140 can additionally or alternatively include determining additional information S144 and/or any other suitable elements.

Selecting a sample from the return signal S141 preferably functions to select a portion of the return signal for analysis. The selected sample is preferably a contiguous window of the received signal. The sample window is preferably sufficiently long in duration to capture an entire period of the output signal. In one example, the sample duration is preferably no less than the sum of the signal period (e.g., equal to the sequence length divided by the symbol rate) and the maximum propagation delay (e.g., equal to twice the range divided by the speed of signal propagation, such as the speed of light in the environment surrounding the system, which corresponds to the round-trip propagation time for an output signal that reflects off an external location at a distance equal to the range). However, S141 can additionally or alternatively include selecting a window of any other suitable duration, and/or selecting any other suitable sample.

Filtering the sample S142 preferably functions to isolate portions of the sample associated with (e.g., substantially matching) the corresponding output signal. S142 preferably includes performing a digital filtering process (e.g., performed computationally), such as implemented by a processing module (e.g., as described above). However, S142 can additionally or alternatively include otherwise performing the filtering process (e.g., analog and/or digital filtering process, such as one implemented by a filter circuit). The filter applied to the sample is preferably a matched filter (or substantially matched filter) for the corresponding output signal, but can additionally or alternatively be any other suitable filter.

In one embodiment, S142 includes determining a convolution S1421 (e.g., circular convolution) of the output signal with the sample, preferably wherein one of the two are time-reversed (e.g., convolution of a time-reversed version of the periodic output signal with the sample, or convolution of the periodic output signal with a time-reversed version of the sample), such as a circular convolution of a time-reversed version of the periodic output signal with the sample. Although described herein as determining a convolution of the sample with the output signal, a person of skill in the art will recognize that S142 can analogously include determining a correlation of the sample and the output signal.

In a first variation, the convolution is determined (partially or entirely) in the frequency domain. For example, determining the convolution can include: determining a Fourier transform (e.g., discrete Fourier transform, such as the FFT) of the sample, determining a Fourier transform (e.g., discrete Fourier transform) of the output signal (and/or retrieving a previously-determined Fourier transform of the output signal, such as one determined for a prior iteration of S142), multiplying the transformed output signal with the transformed sample (e.g., determining the Hadamard product of the transformed output signal and the transformed sample), and determining an inverse Fourier transform (e.g., inverse discrete Fourier transform) of the product (which is the convolution of the two).

In a second variation (e.g., in which the PB-LCC is a binary code), the convolution is determined in the time domain (e.g., entirely in the time domain, without transformation into and/or out of the frequency domain). In some examples of this variation, if the PB-LCC is a binary code, the computational requirements associated with determining the convolution can be significantly reduced (as compared with computation of the PB-LCC for an analog code and/or a digital code including several levels). For example, the computation may include only delay and sum operations, which (in some examples) may be easily implemented in a GPU, FPGA, and/or ASIC and/or require only minimal computational resources to perform.

Figure 6A:
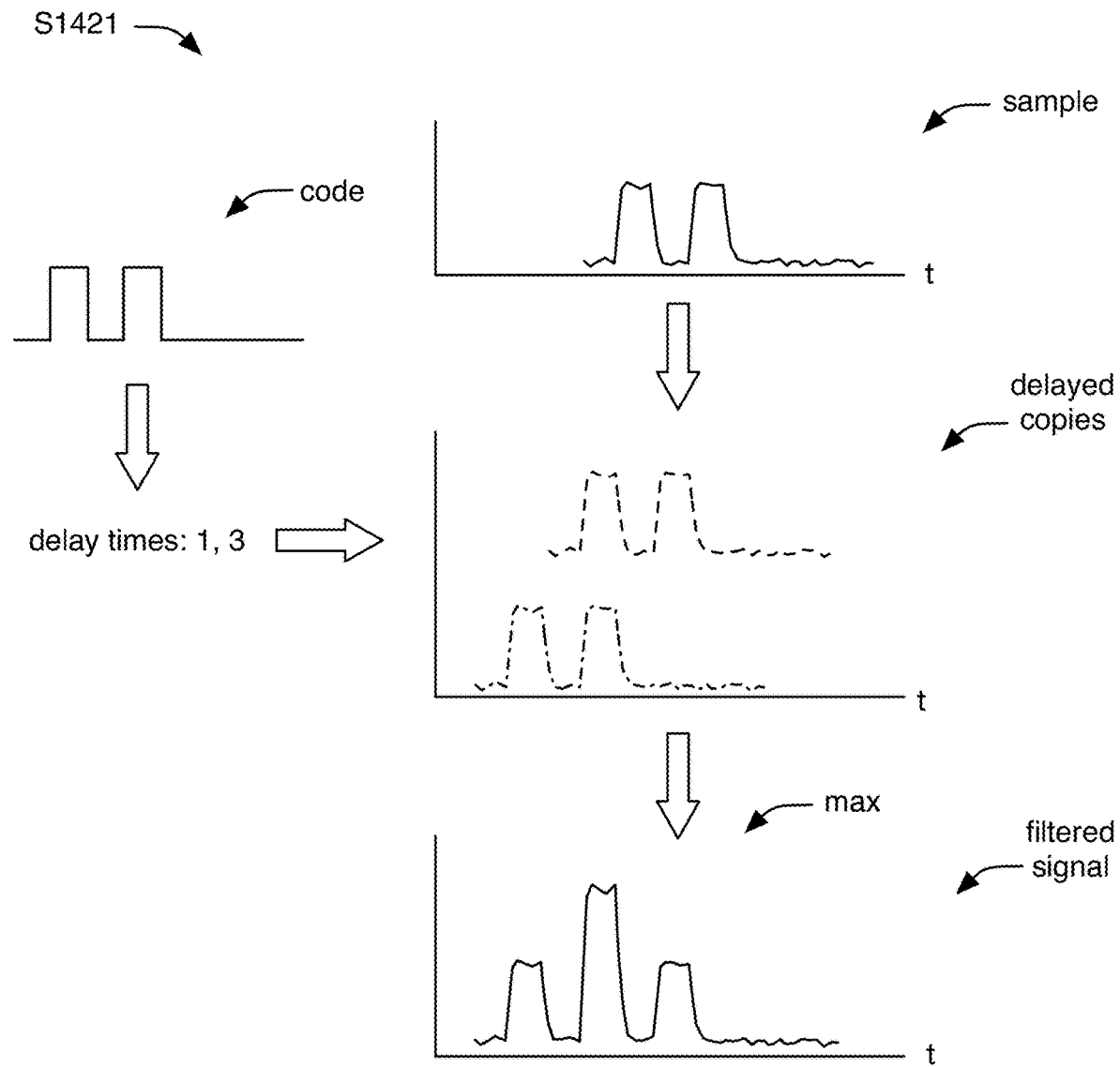
FIGS. 6A-6B are schematic representations of a first and second example, respectively, of applying a matched filter in the time domain.
Figure 6B:
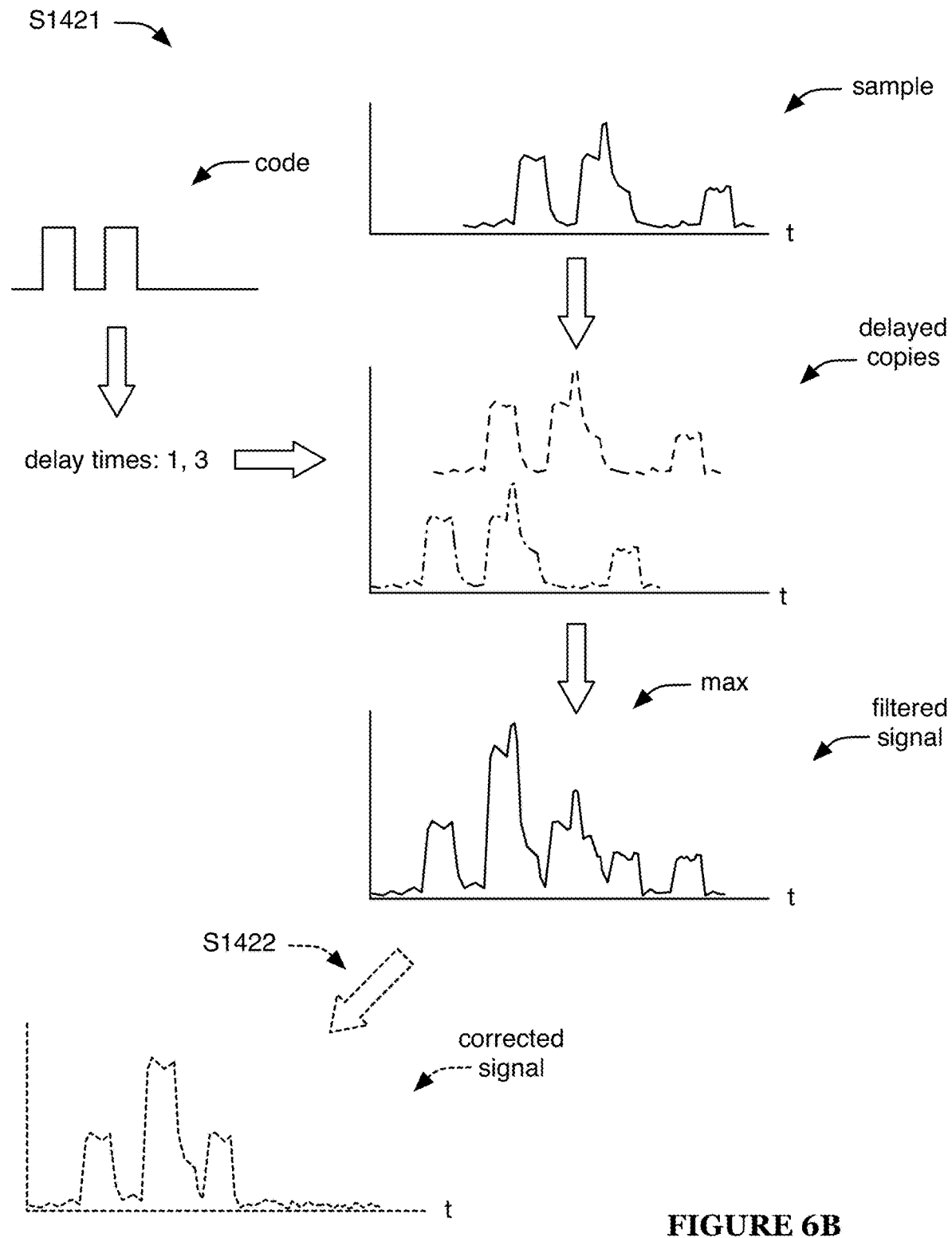

In one such example, determining the convolution includes determining a set of delay times based on the binary code, generating a set of delayed copies of the sample based on the set of delay times, and summing the delayed copies. The set of delay times is preferably determined such that it includes one delay time associated with each 'high' level occurrence (e.g., '1' bit) of the binary code (e.g., such that the set of delay times is collectively indicative of the binary code), wherein the delay time is preferably equal to the occurrence time of the associated 'high' level occurrence (relative to a reference time, such a code start time); in some cases (e.g., in which the first bit of the code is a '1'), one of the delay times may be 0, corresponding to no delay. For each delay time, a corresponding delayed copy of the sample is preferably generated; in the case of a 0 delay time (indicating no delay), the original sample can be used as one of the delay times of the set, and a person of skill in the art will understand that, under these circumstances, the original sample can serve as a "corresponding delayed copy" even though, in some examples, no delay operation may be performed to generate it. In this example, the convolution is equal to the sum of the delayed copies of this set, and so the sum of the delayed copies of the set is preferably determined. In a first specific example (e.g., as shown in FIGS. 6A-6B), the binary code 01010000 would result in a set of two delay times (corresponding to the two '1' bits): 1 bit duration (wherein a 'bit duration' is the length of time between subsequent bits in the output signal) and 3 bit durations, respectively. Accordingly, in this specific example, two delayed copies are preferably generated and summed to determine the convolution: one delayed by (t−1) bit durations, and another delayed by (t−3) bit durations, where t can be any constant additional delay (for example, t can be equal to the code duration; or alternatively can be equal to the largest subtrahend of all the delay times, such that the corresponding delay time is zero). In a second specific example, the binary code 1011010 would result in a set of four delay times (corresponding to the four '1' bits): 0 bit durations, 3 bit durations, 4 bit durations, and 6 bit durations. Accordingly, in this specific example, four delayed copies are preferably generated and summed to determine the convolution: a first delayed by (t−0)=t bit durations, a second delayed by (t−3) bit durations, a third delayed by (t−4) bit durations, and a fourth delayed by (t−6) bit durations (where, as before, t can be any constant additional delay).

In a variation of this example, delayed copies of a sample that has been time-reversed could be generated (rather than delayed copies of the original sample), with relative delays equal to the negative of the delays described above. Following the first specific example above, the binary code 01010000 would result in delay times of 1 and 3. Optionally, any constant additional delay could be added uniformly to (or subtracted uniformly from) all of the delayed copies, and the matched filter could be applied analogously to the description above. In this variation, the resulting filtered sample will typically be time-reversed relative to the filtered sample produced by the example described above, and possibly shifted temporally.

However, S1421 can additionally or alternatively include determining the convolution in any other suitable manner.

S142 can optionally include correcting one or more signals for cross-correlation S1422 between codes (e.g., PB-LCCs), preferably codes corresponding to different concurrently (or substantially concurrently) transmitted optical outputs. The signal(s) to correct is preferably the sample after one or more prior filtering steps, such as application of a matched filter (e.g., as described above regarding S1421), but can additionally or alternatively include the sample as received and/or any other suitable signals.

In one example, N different optical outputs are transmitted concurrently (e.g., in S120), each corresponding to a different code (e.g., a different PB-LCC), and S1421 is performed on the sample for each of the N codes, resulting in N filtered samples. Each combination of two of the N codes corresponds to a respective cross-correlation, denoted $C_{i,j}$ for the cross-correlation of codes i and j. For any particular filtered sample i (denoted $S_i$) associated with a particular code i (and a particular optical output i encoded with the code i), the correction can be performed based on the cross-correlations of that particular code with the other N−1 codes (e.g., based on portions thereof, such as the portion of each that is within the phase bound defined by the PB-LCCs) and on the other N−1 filtered samples. In one example, correcting filtered sample 1 (having a peak at $t_1$, corresponding to a phase shift of $t_1$) can include, for each of the other filtered samples $S_j$ (each having a peak at $t_j$, corresponding to a phase shift of $t_j$) where $j \in \{2, \ldots, N\}$ (i.e., filtered samples 2 through N): based on the filtered sample $S)(t)$, the associated cross-correlation $C_{1,j}(\tau)$, and the relative phase shift $\Delta t_{1,j} = t_j - t_1$ between them, determining the expected interference $I_{1,j}$ in filtered sample $S_1$ that is expected to arise from the optical signal(s) encoded with code j, and subtracting this interference $I_{1,j}$ from the filtered sample $S_1$; in an example, the interference $I_{i,j}(t)$ can be calculated as the product of the phase-shifted filtered sample $S_j(t-\Delta t_{i,j})$ and the associated cross-correlation $C_{i,j}(\Delta t_{i,j})$ (that is, $I_{i,j}(t) = S_j(t-\Delta t_{i,j})C_{i,j}(\Delta t_{i,j})$), but can additionally or alternatively be determined in any other suitable manner. Accordingly, the corrected sample $S'_1$ can be calculated based on the equation $$S'_1 = S_1 - \sum_{j=2}^{N} I_{1,j}.$$

Analogously, for any given value of $i \in \{1, \ldots, N\}$, and the associated filtered sample $S_i$, the corrected sample $S'_i$ can be calculated by subtracting $I_{i,j}$ for each $j \neq i$: $S'_i = S_i - \Sigma_{j \neq i} I_{i,j}$. In an alternative variation, the correction may be performed based only on a subset of the other filtered samples (e.g., and thus, only a subset of the cross-correlations). For example, if the cross-correlation between two codes is low throughout the entirety of a range of interest (e.g., the phase bound defined by two PB-LCCs), those cross-correlations could be ignored (e.g., treated as if they were equal to zero for all phase offsets) for the purposes of these corrections, thereby reducing the computational requirements of the correction.

S1422 is preferably performed to correct each filtered sample (but can alternatively be performed only for a subset thereof). Each filtered sample is preferably corrected based on the other filtered samples (e.g., without correction, or having undergone the same number of corrected iterations as the sample currently being corrected). However, in alternate variations, some or all of the other samples used to perform the correction may have already been corrected (e.g., having undergone more corrections than the sample currently being corrected), and/or alternatively having undergone fewer corrections than the sample currently being corrected (e.g., not having undergone any corrections). In a first example (e.g., performed after correcting filtered sample 1, but before correcting any other filtered samples), filtered sample 2 is corrected based on a corrected sample 1 and (uncorrected) filtered samples 3 through $$N: S'_2(t) = S_2(t) - S'_1(t - \Delta t_{2,1})C_{1,2}(\Delta t_{2,1}) - \sum_{j=3}^{N} S_j(t - \Delta t_{2,j})C_{2,j}(\Delta t_{2,j}).$$

In a second example (e.g., performed after correcting all filtered samples except filtered sample N), filtered sample N is corrected based on the corrected samples 1 through $$N-1: S'_N(t) = S_N(t) - \sum_{j=1}^{N-1} S'_j(t - \Delta t_{N,j})C_{N,j}(\Delta t_{N,j}).$$

In some embodiments, S1422 can be performed multiple times (e.g., iteratively), such as to determine further corrected samples based on the corrected samples. For example, each further corrected sample $S''_i$ can be determined based on the corrected samples and the cross-correlations as $S''_i(t) = S'_i(t) - \Sigma_{j \neq i} S'_j(t - \Delta t_{i,j})C_{i,j}(\Delta t_{i,j})$, and so on for additional iterations. In a specific example, two iterations of S1422 are performed, and the further corrected samples $S''_i$ are used as "filtered samples" in the method elements that follow (e.g., those described below, such as S143 and/or S144).

S142 preferably generates a filtered sample that is a function of delay time. The filtered sample is typically a discrete function (e.g., the sample and/or output signal includes data only at discrete points in time, the calculation is performed at discrete points in delay time, etc.) but can alternatively be a continuous function and/or any other suitable function.

S142 can optionally include zero-padding the sample (e.g., wherein one or more zero-valued points are inserted into the sample, such as between each observed point of the sample determined in S130). The sample can be zero-padded before performing the filtering, and/or the filtered sample can be zero-padded after filtering.

However, S142 can additionally or alternatively include filtering the sample in any other suitable manner.

Determining information based on the signal S143 preferably functions to detect the presence and/or absence of (and/or to determine information, such as distance, optical properties, etc., regarding) objects in the environment (e.g., the external locations off of which the output signal is reflected). S143 is preferably performed based on the filtered sample generated in S142 (e.g., the filtered sample generated in S1421, the corrected or further corrected sample generated in S1422, etc.), but can additionally or alternatively be performed using the as-received sample selected in S141 and/or any other suitable information associated with the signal (e.g., received signal).

S143 can optionally include determining a noise floor of the sample. The noise floor can be determined based on the sample selected in S141, based on a calibration sample, preferably collected while the output signal is not being emitted (e.g., while no output signals are being emitted, when all other output signals are being emitted, etc.), based on any other suitable sample, estimated (e.g., based on typical conditions), and/or determined in any other suitable manner. The noise floor can be determined based on (e.g., equal to) a measure (e.g., median, average, alpha-trimmed average, inter-quartile average, etc.) of a power spectrum of the sample used to determine the noise floor (e.g., the sample selected in S141, the calibration sample, etc.).

S143 preferably includes determining a delay time corresponding to an extremum of the data (e.g., a maximum of the sample, preferably the filtered sample). This delay time is preferably determined using one or more interpolation techniques (e.g., wherein the determined delay time corresponds to the maximum-valued interpolated point). Such interpolation can have several benefits, including, for example, improving detection accuracy and/or enabling CRLB estimation.

For example, S143 can include determining an interpolated delay time (e.g., corresponding to an extremum of the interpolated data) by performing a continuous curve interpolation (e.g., parabolic interpolation, polynomial interpolation such as using a polynomial of order 2, 3, 4, 5, 6, 7-10 or any other suitable order polynomial, sine function interpolation, Taylor-series interpolation, etc.), a discrete Fourier transform-based interpolation (e.g., zero-padding a frequency spectrum associated with a discrete Fourier transform of the data, convolving the zero-padded frequency spectrum with an interpolation kernel such as a sine function kernel, and generating interpolated time domain data by determining an inverse discrete Fourier transform of the convolution), and/or any other suitable interpolation technique(s). The interpolation is preferably performed using only (or substantially only) linear computational operations, which can enable rapid computation, but can additionally or alternatively be performed using any other suitable operations. The delay time can additionally or alternatively be determined using one or more regression techniques (e.g., to determine a continuous curve, such as a curve of one of the types described above regarding interpolation and/or any other suitable type of curve, that fits the data or a subset thereof, such as a subset near the extremum).

S143 can optionally include applying a delay time correction (e.g., after interpolation and/or regression). For example, the method can include correcting the interpolated delay time based on a correction relationship (e.g., predetermined relationship, such as determined during a system calibration, fixed for all such systems, etc.) between the interpolated delay time and the corrected delay time, such as a relationship associated with an analytical curve (e.g., polynomial, such as a polynomial of order 2, 3, 4, 5, 6, 7-10 or any other suitable order polynomial) and/or a numerical relationship (e.g., stored in a lookup table).

In one example, the interpolated delay time is determined by performing a parabolic interpolation using three data points: the extremal data point and the point neighboring the extremal data point on either side. In a variation of this example, the interpolated delay time is then corrected based on a polynomial correction relationship (e.g., associated with a sixth-order polynomial of the interpolated delay time).

However, S143 can alternatively include determining the delay time without interpolation (e.g., wherein the determined delay time is the time corresponding to the maximum-valued discretized point of the sample), and/or determining the delay time in any other suitable manner. In embodiments in which a noise floor is determined, if the determined delay time corresponds to a point exceeding the noise floor (e.g., greater than the noise floor, a value proportional to the noise floor, greater by more than a threshold amount, etc.; considering a single point, a peak including at least a threshold number of points, etc.), the delay time can be considered to represent a return (e.g., detection event), whereas points not exceeding the noise floor are preferably not considered to represent returns. If no noise floor is determined, any delay time determined as described here is preferably considered to represent a return.

This delay time (e.g., if considered to represent a return) corresponds to the propagation time of the output signal (e.g., time between emission from the optical emitter and reception at the optical detector). Thus, the delay time typically corresponds to the distance to the external location from which the beam reflected (e.g., wherein the delay time is equal to twice the distance divided by the signal propagation speed, typically the speed of light).

The information determined in S143 (e.g., delay time and/or distance corresponding to each return) is preferably stored in association with information associated with the detected object orientation with respect to the system (e.g., the beam direction). For example, the relative location of the object with respect to the system can be stored (e.g., wherein many such returns result in the determination and/or storage of a point cloud representing the environment surrounding the system), such as stored as a point in 3-dimensional space (e.g., wherein the origin of the space represents the system). Optionally, other information can be stored in association with this information, such as the corresponding value (e.g., of the raw and/or interpolated sample), phase information, and/or any other suitable information.

Additionally or alternatively, S143 can include selecting data for downstream analysis (e.g., and not include determining a particular delay time or times). In one embodiment, S143 can include selecting one or more portions of the sample (e.g., filtered sample) as portions of interest. For example, these portions could include the one or more times corresponding to (e.g., surrounding by a threshold time window, such as a bit duration) one or more maxima in the sample. In this example, these one or more portions of interest (which may correspond approximately to the delay times that could have been determined as described above) can be provided for downstream analysis (e.g., spatial and/or temporal filtering, such as based on a number of samples corresponding to different times and/or positions in the environment), in which determinations about these portions (e.g., filtering for true returns versus noise, determining precise return timing, etc.) can be made.

However, S143 can additionally or alternatively include determining any other suitable information in any suitable manner.

S140 can optionally include determining additional information S144. In some embodiments, S144 can function to detect multiple extrema (e.g., corresponding to multiple reflections) in a single sample. For example, S144 can enable recognition of "multi-return" events (e.g., wherein a beam is incident on the edge of an object, and thus a first portion of the beam is reflected by the object which a second portion of the beam continues on, possibly to be reflected by a second object; wherein a beam is incident on a semi-transparent object, and thus the beam is partially reflected by the object and partially transmitted through the object, possibly to be reflected by a second object; etc.). Preferably, S144 includes detecting all discernable extrema of interest (e.g., maxima above the noise floor).

Figure 7:
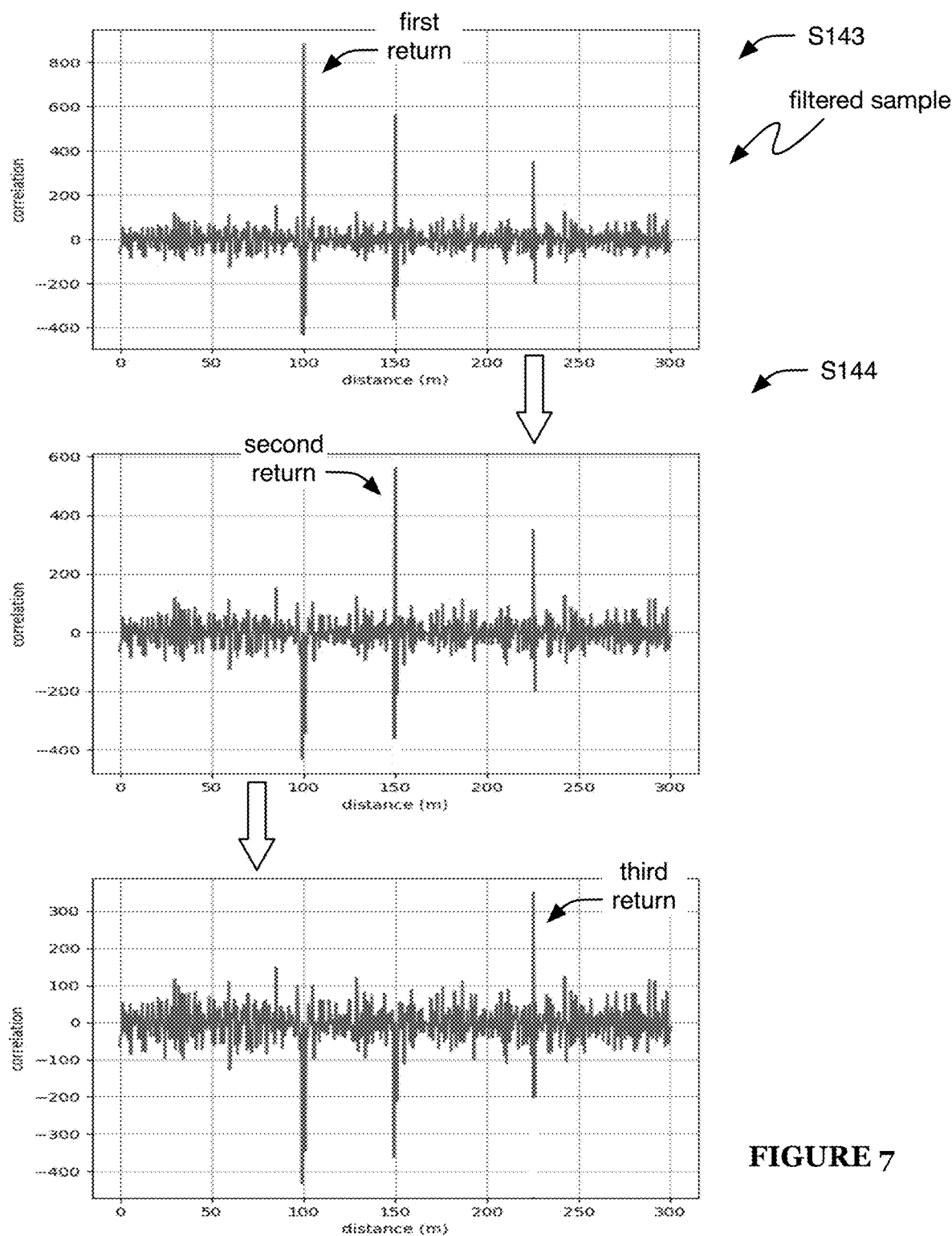
FIG. 7 is a schematic representation of a specific example of analyzing a return signal.

In one embodiment, S144 includes, after performing S143, altering the sample (e.g., filtered sample) to remove the peak that includes the delay time determined in S143 (e.g., as shown in FIG. 7). In a first example, removing the peak includes selecting the peak by finding the nearest local minimum on each side of the determined delay time (which corresponds to the maximum), and altering all data between those minima (e.g., setting all values between the minima to zero, linearly interpolating between the minima, etc.). In a second example, removing the peak includes performing a peak-fitting procedure to select the peak (e.g., determining a peak fit function corresponding to the peak), then subtracting the peak fit values (e.g., values of the peak fit function) from the corresponding points of the sample. In a third example, removing the peak includes approximating a selection of the peak by selecting a window of points (e.g., predetermined number of points, predetermined delay time window, etc.) on each side of the determined delay time (preferably including the point at the determined delay time), and altering all data within the window (e.g., setting all values between the minima to zero, linearly interpolating between the points just outside either side of the window, etc.). However, the peak can additionally or alternatively be removed (and/or otherwise diminished, marked to be ignored, etc.) in any other suitable manner.

In this embodiment, after removing the peak, S143 is repeated using the altered sample (e.g., wherein this repetition of S143 can determine a second delay time, corresponding to the maximum value of the altered sample). The process of removing peaks and then repeating S143 using the newly-altered sample is preferably repeated until no additional returns are found (e.g., all peaks that exceed the noise floor have been removed).

In a second embodiment, S144 includes performing a modified version of S143 in which multiple extrema (e.g., in the filtered sample) and/or associated delay times are determined substantially concurrently (e.g., all determined during a single pass through the filtered sample). In this embodiment, S144 is preferably performed instead of S143, but can additionally or alternatively be performed after S143 and/or with any other suitable timing. In this embodiment, S144 preferably includes searching the filtered sample for local extrema (preferably maxima, but optionally minima), wherein the first several or top (e.g., largest or smallest magnitude) several extrema are stored. In an example of this embodiment, a specific number of buffers are designated for storing information associated with the extrema (e.g., delay time, magnitude, etc.). Upon finding an extremum, the associated information is stored in an empty buffer. In a first variation, if no empty buffers remain, and the search for extrema terminates (e.g., and S144 is complete). In a second variation, if no empty buffers remain, the magnitude of the current extremum is compared to the least significant (e.g., for maxima, smallest magnitude) stored extremum; if the current extremum is more significant, its associated data is stored in the buffer, replacing the previously-stored information associated with the less significant extremum.

However, S144 can additionally or alternatively include determining any other suitable information in any suitable manner.

Figure 5B:
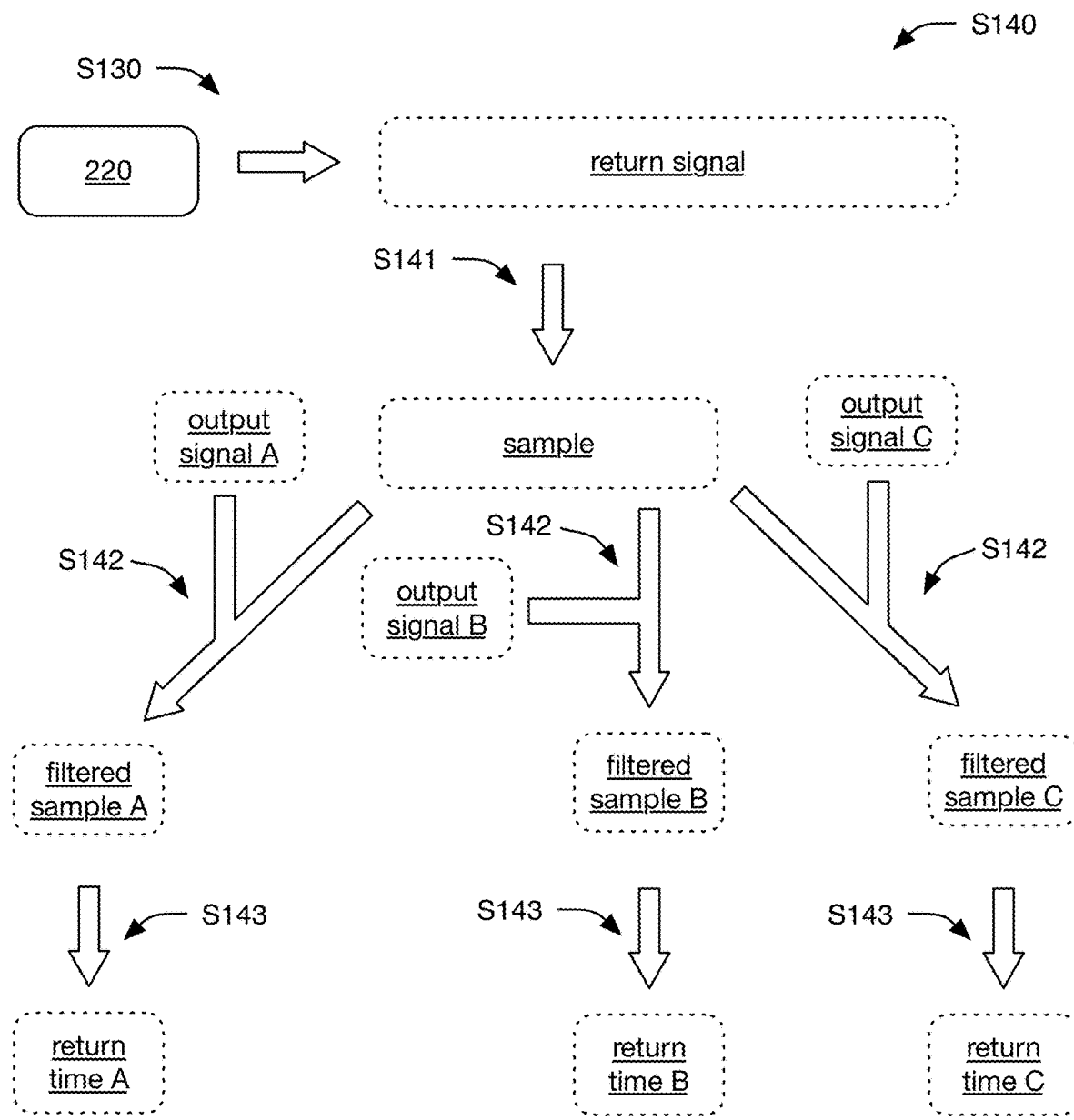

In embodiments in which multiple signals are output concurrently and/or close in time (e.g., wherein several such signals may be received concurrently in S130), S140 is preferably performed for each such output signal (e.g., as shown in FIG. 5B). For example (e.g., wherein the sequence length and symbol rate for all the signals is equal), a single sample can be selected (as described above regarding S141) for all such output signals, and then some or all remaining elements of S140 (e.g., S142, S143, S144, etc.) can be performed (e.g., independently) for each such output signal, using the same sample. Because the different output signals preferably have high mutual orthogonality (e.g., as described above, such as a set of PB-LCCs having high mutual orthogonality within a phase bound), a high degree of discrimination between the different output signals can be enabled by this method (e.g., wherein most noise associated with the other output signals is filtered out in S142). Embodiments of the method can additionally or alternatively achieve high mutual interference immunity (e.g., immunity to interference from noise originating from other sources, such as from other lidar systems and/or any other suitable emitters), especially for longer sequence lengths, as these noise sources will also typically have reasonable high orthogonality to the output signals used by the lidar system.

In some examples, S140 is performed such as described in U.S. patent application Ser. No. 16/663,142, filed 24 Oct. 2019 and titled "Lidar System and Method of Operation", which is herein incorporated in its entirety by this reference, and/or one or more elements of S140 are performed such as described in U.S. patent application Ser. No. 16/663,142 regarding (e.g., wherein one or more other elements of S140 are performed such as described above). However, S140 can additionally or alternatively be performed in any other suitable manner.

4.5 Repeating Elements of the Method.

The method 100 can optionally include repeating one or more of the elements described above. One embodiment includes performing S120 and/or S130 (e.g., continuously performing S120 and S130, preferably substantially concurrently), preferably while repeating S140 and/or changing the beam direction (e.g., sweeping the beam around the environment, such as described above). In this embodiment, all or substantially all of the signal received in S130 is preferably analyzed over the iterations of S140 (e.g., wherein for each iteration of S140, a different sample of the received signal, preferably the sample immediately following the previous sample, is used).

In a variation of this embodiment, some or all elements of S110 can optionally be repeated (e.g., periodically, such as after a threshold period of time, a threshold number of iterations of S140, a threshold number of sweeps of the beam, etc.; sporadically; in response to triggers; etc.), wherein S120, S130, and/or S140 can continue to be performed (e.g., based on the new sequence(s) determined in the most recent iteration of S110). In a first example of this variation, a new sequence length is selected (e.g., to alter some or all of the performance metrics, such as accuracy, range, resolution, latency, etc.), such as described above regarding S111, after which S112 is performed based on the new sequence length. In a second example, a new sequence (or sequences) is selected (e.g., as described above regarding S112) using the same sequence length as before (e.g., with a different phase bound). This second example can optionally be performed if the sequence orthogonality (e.g., to external noise sources, such as noise from other lidar systems) is suspected to be poor (e.g., if signal discrimination performance is poor). For example, if another nearby lidar system (e.g., mounted to a vehicle operating near the present lidar system) is using one or more output signals similar to (e.g., not sufficiently orthogonal to) one or more of the current output signals of the present lidar system, the method may not achieve sufficient immunity to this interference source. Thus, by changing the sequence(s), greater mutual interference immunity may be achieved. In a variation, the second example can additionally or alternatively be performed if the phase bound is smaller than desired (e.g., causing an undesired range limitation) and/or if the phase bound is larger than desired (e.g., resulting in a low rejection ratio, such as wherein a high-intensity return signal cannot be sufficiently filtered out of a lower-intensity return signal, resulting in potential false detection events). This second example can additionally or alternatively be performed periodically, sporadically, and/or with any other suitable timing (e.g., changing operation to diagnose whether the system is operating as desired), and/or performed for any other suitable reason.

However, the method 100 can additionally or alternatively include repeating any other suitable elements with any suitable timing.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for environment mapping, comprising:
   selecting a set of phase-bounded low cross-correlation codes (PB-LCCs), the set of PB-LCCs comprising a first PB-LCC and a second PB-LCC, wherein the set of PB-LCCs defines a phase bound;
   generating a first optical output representative of a first output signal, comprising modulating a first substantially continuous-wave carrier signal based on the first PB-LCC;
   generating a second optical output representative of a second output signal, comprising modulating a second substantially continuous-wave carrier signal based on the second PB-LCC;
   throughout a time period, concurrently transmitting the first and second optical outputs into an environment;
   at an optical sensor, receiving a return signal, the return signal comprising:
     a first reflection, from a first object within the environment, of the first optical output; and
     a second reflection, from a second object within the environment, of the second optical output;
   determining a sample by selecting a contiguous time window of the return signal;
   generating a first filtered sample, comprising filtering the sample based on the first PB-LCC;
   determining a first phase delay associated with the first filtered sample, wherein the first phase delay is within the phase bound;
   based on the first phase delay, determining a relative location of the first object;
   generating a second filtered sample, comprising filtering the sample based on the second PB-LCC;
   determining a second delay time associated with the second filtered sample; and
   based on the second delay time, determining a relative location of the second object.

2. The method of claim 1, further comprising:
   generating a third optical output representative of a third output signal, comprising modulating a third substantially continuous-wave carrier signal based on a third PB-LCC of the set of PB-LCCs;
   throughout the time period, concurrent with transmitting the first and second optical outputs into the environment, transmitting the third optical output into the environment;
   generating a third filtered sample, comprising filtering the sample based on the third PB-LCC;
   determining a third delay time associated with the third filtered sample; and
   based on the third delay time, determining a relative location of a third object within the environment; wherein the return signal further comprises a third reflection, from the third object, of the third optical output.

3. The method of claim 2, further comprising:
   generating a fourth optical output representative of a fourth output signal, comprising modulating a fourth substantially continuous-wave carrier signal based on a fourth PB-LCC of the set of PB-LCCs;
   throughout the time period, concurrent with transmitting the first, second, and third optical outputs into the environment, transmitting the fourth optical output into the environment;
   generating a fourth filtered sample, comprising filtering the sample based on the fourth PB-LCC;
   determining a fourth delay time associated with the fourth filtered sample; and
   based on the fourth delay time, determining a relative location of a fourth object within the environment; wherein the return signal further comprises a fourth reflection, from the fourth object, of the fourth optical output.

4. The method of claim 3, wherein the set of PB-LCCs defines a set of pairwise cross-correlations, the method further comprising:
   based on the set of pairwise cross-correlations and the second, third, and fourth filtered samples, correcting the first filtered sample for interference associated with the second, third, and fourth reflections;
   based on the set of pairwise cross-correlations and the first, third, and fourth filtered samples, correcting the second filtered sample for interference associated with the first, third, and fourth reflections;
   based on the set of pairwise cross-correlations and the first, second, and fourth filtered samples, correcting the third filtered sample for interference associated with the first, second, and fourth reflections; and
   based on the set of pairwise cross-correlations and the first, second, and third filtered samples, correcting the fourth filtered sample for interference associated with the first, second, and third reflections.

5. The method of claim 1, wherein the first and second PB-LCCs define a cross-correlation, the method further comprising:

based on the cross-correlation and the second filtered sample, correcting the first filtered sample for interference associated with the second reflection; and based on the cross-correlation and the first filtered sample, correcting the second filtered sample for interference associated with the first reflection.

6. The method of claim 5, further comprising:

based on the cross-correlation and the corrected second filtered sample, further correcting the corrected first filtered sample for interference associated with the second reflection; and based on the cross-correlation and the corrected first filtered sample, further correcting the corrected second filtered sample for interference associated with the first reflection.

7. The method of claim 1, wherein filtering the sample based on the first PB-LCC comprises applying a matched filter, associated with the first PB-LCC, to the sample.

8. The method of claim 7, wherein applying the matched filter is performed in the frequency domain.

9. The method of claim 7, wherein:

the first PB-LCC is a binary code; and applying the matched filter is performed in the time domain.

10. The method of claim 9, wherein applying the matched filter to a signal comprises:

generating a set of delayed copies of the signal based on a set of delay times, comprising, for each delay time of the set of delay times, generating, based on the delay time, a respective delayed copy of the set of delayed copies, wherein the set of delay times is indicative of the first PB-LCC; and determining a sum of the delayed copies of the set.

11. The method of claim 1, wherein the first optical output is substantially periodic and the second optical output is substantially periodic.

12. The method of claim 11, wherein:

concurrently transmitting the first and second optical outputs into the environment comprises transmitting the first and second optical outputs substantially continuously throughout the time period; and the return signal is received at the optical sensor during the time period.

13. The method of claim 1, wherein modulating the first substantially continuous-wave carrier signal based on the first PB-LCC comprises performing optical frequency modulation.

14. The method of claim 1, wherein modulating the first substantially continuous-wave carrier signal based on the first PB-LCC comprises performing amplitude modulation.

15. The method of claim 1, wherein determining the first phase delay comprises:

determining an extremum of the first filtered sample; and determining the phase delay based on the extremum.

16. The method of claim 1, wherein:

the first optical output is transmit into the environment by a first laser; and the second optical output is transmit into the environment by a second laser.

17. The method of claim 16, wherein the optical sensor comprises a photodiode, wherein receiving the return signal comprises receiving the first and second reflections concurrently at the photodiode.

18. The method of claim 1, wherein:

the first optical output is transmit into the environment in a first direction; and the second optical output is transmit into the environment in a second direction different from the first direction.

19. The method of claim 1, further comprising, before selecting the set of PB-LCCs, selecting a sequence length, wherein the length of each PB-LCC of the set is equal to the sequence length.

20. The method of claim 19, wherein the sequence length is selected based on a first set of desired performance metrics comprising at least one of: accuracy, range, resolution, or latency, the method further comprising:

based on the return signal, selecting a second sequence length different from the sequence length;

selecting a second set of PB-LCCs, the second set of PB-LCCs comprising a third PB-LCC and a fourth PB-LCC, wherein the length of each PB-LCC of the second set is equal to the second sequence length;

generating a third optical output representative of a third output signal, comprising modulating a third substantially continuous-wave carrier signal based on the third PB-LCC;

generating a fourth optical output representative of a fourth output signal, comprising modulating a fourth substantially continuous-wave carrier signal based on the fourth PB-LCC;

throughout a second time period after the time period, concurrently transmitting the third and fourth optical outputs into an environment;

at the optical sensor, receiving a second return signal, the second return signal comprising a reflection of at least one of the first or second optical output;

determining a second sample by selecting a contiguous time window of the second return signal;

generating a third filtered sample, comprising filtering the second sample based on the third PB-LCC; and generating a fourth filtered sample, comprising filtering the second sample based on the fourth PB-LCC.

21. The method of claim 1, wherein:

the first PB-LCC comprises a first sub-sequence and a second sub-sequence;

the sample is selected from a first portion of the return signal associated with the first sub-sequence; and filtering the sample based on the first PB-LCC comprises:

determining a second sample by selecting a second contiguous time window from a second portion of the return signal, the second portion associated with the second sub-sequence;

combining the first and second samples to generate a combined sample; and applying a matched filter, associated with the first PB-LCC, to the combined sample.

* * * * *